United States Patent
Chen

(10) Patent No.: US 10,579,236 B2
(45) Date of Patent: Mar. 3, 2020

(54) RESPONDING TO USER INPUT INCLUDING PROVIDING USER FEEDBACK

(71) Applicant: ATI Technologies ULC, Markham (CA)

(72) Inventor: I-Cheng Chen, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 401 days.

(21) Appl. No.: 14/310,057

(22) Filed: Jun. 20, 2014

(65) Prior Publication Data

US 2015/0370458 A1    Dec. 24, 2015

(51) Int. Cl.
| | |
|---|---|
| *G06F 3/0484* | (2013.01) |
| *G06F 3/0485* | (2013.01) |
| *G06F 3/0488* | (2013.01) |
| *G06F 1/3234* | (2019.01) |
| *G06F 1/3215* | (2019.01) |
| *G06F 3/16* | (2006.01) |

(52) U.S. Cl.
CPC ........ *G06F 3/04845* (2013.01); *G06F 1/3215* (2013.01); *G06F 1/3265* (2013.01); *G06F 3/0485* (2013.01); *G06F 3/0488* (2013.01); *G06F 3/04842* (2013.01); *G06F 3/167* (2013.01); *Y02D 10/153* (2018.01)

(58) Field of Classification Search
CPC ............. G06F 3/04845; G06F 3/04842; G06F 3/0485; G06F 3/167; G06F 3/0488; G06F 1/324; G06F 1/3215; G06F 1/3265; G06F 1/3275; G06F 1/3203; G06F 1/3287; G09G 5/18; G09G 2330/021; G09G 2310/04; G09G 2330/022; G09G 5/363; G09G 5/393; Y02D 10/153
See application file for complete search history.

(56) References Cited

U.S. PATENT DOCUMENTS

| | | | |
|---|---|---|---|
| 9,625,999 B2 * | 4/2017 | Lu ......................... | G06F 3/0304 |
| 2003/0009705 A1 * | 1/2003 | Thelander ............. | G06F 1/3203 713/340 |
| 2005/0165609 A1 * | 7/2005 | Zuberec ................. | G10L 15/22 704/270 |
| 2008/0168201 A1 * | 7/2008 | de Cesare ............. | G06F 9/4825 710/260 |
| 2010/0029255 A1 * | 2/2010 | Kim ...................... | G06F 1/1626 455/414.2 |

(Continued)

*Primary Examiner* — Tadesse Hailu
(74) *Attorney, Agent, or Firm* — Faegre Baker Daniels LLP

(57) ABSTRACT

An apparatus and a method for responding to user input by way of a user interface for an apparatus that employs a display detect user input associated with the display during a static screen condition on the display wherein a static image provided by a source image provider is displayed on the display. In response to detecting the user input, the method and apparatus provide user feedback by incorporating a first type of change to the static image displayed on the display while the source image provider is in a reduced power mode wherein a standby power is available to the source image provider and communicate control information to the source image provider. The method and apparatus receive from the source image provider updated image content based on the communicated control information.

23 Claims, 10 Drawing Sheets

(56) References Cited

U.S. PATENT DOCUMENTS

| | | | |
|---|---|---|---|
| 2010/0277429 A1* | 11/2010 | Day | G06F 3/0416 345/173 |
| 2010/0277505 A1* | 11/2010 | Ludden | G06F 3/0416 345/634 |
| 2011/0022859 A1* | 1/2011 | More | G06F 1/3203 713/300 |
| 2011/0039508 A1* | 2/2011 | Lindahl | G06F 1/3203 455/230 |
| 2011/0080349 A1* | 4/2011 | Holbein | G06F 1/3203 345/173 |
| 2013/0067399 A1* | 3/2013 | Elliott | G06F 3/0482 715/800 |
| 2013/0166932 A1* | 6/2013 | Iarovici | G06F 1/3206 713/323 |
| 2014/0092031 A1* | 4/2014 | Schwartz | G06F 1/3206 345/173 |
| 2014/0120988 A1* | 5/2014 | Gunn | G06F 3/0488 455/566 |
| 2014/0253521 A1* | 9/2014 | Hicks | G06F 3/03545 345/179 |
| 2014/0281607 A1* | 9/2014 | Tse | G06F 1/3287 713/320 |
| 2014/0354553 A1* | 12/2014 | Dai | G06F 3/0416 345/173 |
| 2015/0042570 A1* | 2/2015 | Lombardi | G06F 1/3206 345/173 |
| 2015/0042572 A1* | 2/2015 | Lombardi | G09G 3/3208 345/173 |
| 2015/0082255 A1* | 3/2015 | DeVries | G06F 3/0488 715/863 |
| 2015/0082446 A1* | 3/2015 | Flowers | G06F 3/0488 726/26 |
| 2015/0089419 A1* | 3/2015 | Hwang | G06F 3/017 715/768 |
| 2015/0103034 A1* | 4/2015 | Shepelev | G06F 3/0416 345/174 |
| 2015/0194137 A1* | 7/2015 | Wyatt | G09G 5/393 345/173 |
| 2015/0222673 A1* | 8/2015 | Suzuki | G06F 3/0488 715/211 |
| 2015/0268719 A1* | 9/2015 | Li | G06F 3/013 345/156 |
| 2015/0324287 A1* | 11/2015 | Priel | G06F 12/0897 711/118 |
| 2016/0216753 A1* | 7/2016 | Shedletsky | G06F 1/1626 |
| 2017/0279957 A1* | 9/2017 | Abramson et al. | H04M 1/72577 |

\* cited by examiner

RESPONDING TO USER INPUT INCLUDING PROVIDING USER FEEDBACK

BACKGROUND OF THE DISCLOSURE

The disclosure relates generally to user interfaces and more particularly to providing user feedback in response to user input.

Common computing systems support one or more panel displays and a touch input device that interfaces with a user, such as a touch panel display on a smart phone or tablet and an associated touch input transducer and touch sensor logic, where the touch input transducer may be, for example, a glass layer of the touch panel display with which the user's finger or fingers make contact. The user provides input through, for example, the touch input transducer, and the display shows the response of the computing system to the user's input.

FIG. 1 is a functional block diagram of a conventional computing system 100 having a user interface subsystem 102, such as a touch panel display of a smart phone or tablet and components used to implement a self refresh capability for the touch panel display; a source image device 104; and a touch input device 106. The source image device 104 may include, for example, the majority of the data and image processing capabilities of a smart phone or tablet. For example, the source image device 104 may include an accelerated processing unit (APU). As known in the art, an APU includes one or more central processing unit (CPU) cores and one or more graphics processing unit (GPU) cores on the same die. However, the source image device 104 may be or may include any suitable computing platform or processor(s), such as a CPU, a GPU, a CPU and a GPU but not an APU, one or more digital signal processors (DSPs), one or more application-specific integrated circuits (ASICs), etc. The touch input device 106 may include a touch input transducer as discussed above.

The user interface subsystem 102 includes a display 108 such as a touch panel display of a smart phone or tablet as discussed above, as well as panel display logic 110 and a self refresh memory 112. The source image device 104 includes a source image provider 114. The source image provider 114 generates updated image content for display on the display 108 that is responsive to the user input, such as by receiving an output signal 115 generated by the touch input device 106 in response to the user input, which may be, for example, a tap, swipe, or pinch. The source image provider 114 may include one or more of the computing platform(s) or processor(s) included within the source image device 104 such as, for example, a GPU or one or more processors that implement graphics processing operations but are not integrated as a GPU.

The source image device 104 also includes a frame buffer 116 and a display content engine (DCE) 118. As known in the art, the DCE 118 drives the output of the display 108 by providing source images to the panel display logic 110 for display on the display 108. As further known in the art, in order to implement the self refresh capability for the display 108, the panel display logic 110 stores the most recent source image received from the DCE 118 in the self refresh memory 112. During periods in which the DCE 118 stops providing new source images to the panel display logic 110, the DCE 118 is powered down and the panel display logic 110 retrieves the most recent source image received from the DCE 118 from the self refresh memory 112 in order to maintain the most recently received source image on the display 108.

As the requirements of computing systems, such as size constraints, complexity, battery life requirements, and so on, continue to become more strict, it will be necessary to realize greater power savings than those achieved by powering down the DCE 118. However, if additional components of the source image device 104, such as the source image provider 114, are powered down when updated image content is not being provided for display on the display 108, the user will perceive a delay in the response of the computing system 100 to his or her touch input. For example, the user may provide a touch input by using his or her finger to input a swiping motion to the touch input device 106 in order to scroll down. The user of a modern computing device expects a response to a touch input, such as the example swiping motion, on the order of 100 milliseconds (ms) after the user provides the touch input. However, powering down the source image provider 114 by, for example, putting the source image provider 114 into one of various types of "sleep" modes would involve sending a signal to the source image provider 114 to increase its power, and would further involve the source image provider 114 being "woken up" in response to such a signal to increase power. After "waking up" to a state that allows it to generate updated source image content, the source image provider 114 would then process information regarding the user input to generate that updated source image content, and would then need to provide that updated source image content to the display 108 via the frame buffer 116, the DCE 118, and the panel display logic 110.

These actions may cause the computing system 100 to take on the order of 500 ms after the user's touch input to provide the desired updated image content on the display 108, which in this example would be a scrolled-down version of the content that was originally displayed on the display 108 at the time of the user's touch input. Because of the potential delay on the order of 500 ms, the user would thus perceive the computing system 100 as being unresponsive for a time after his or her touch input.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Figure 1:
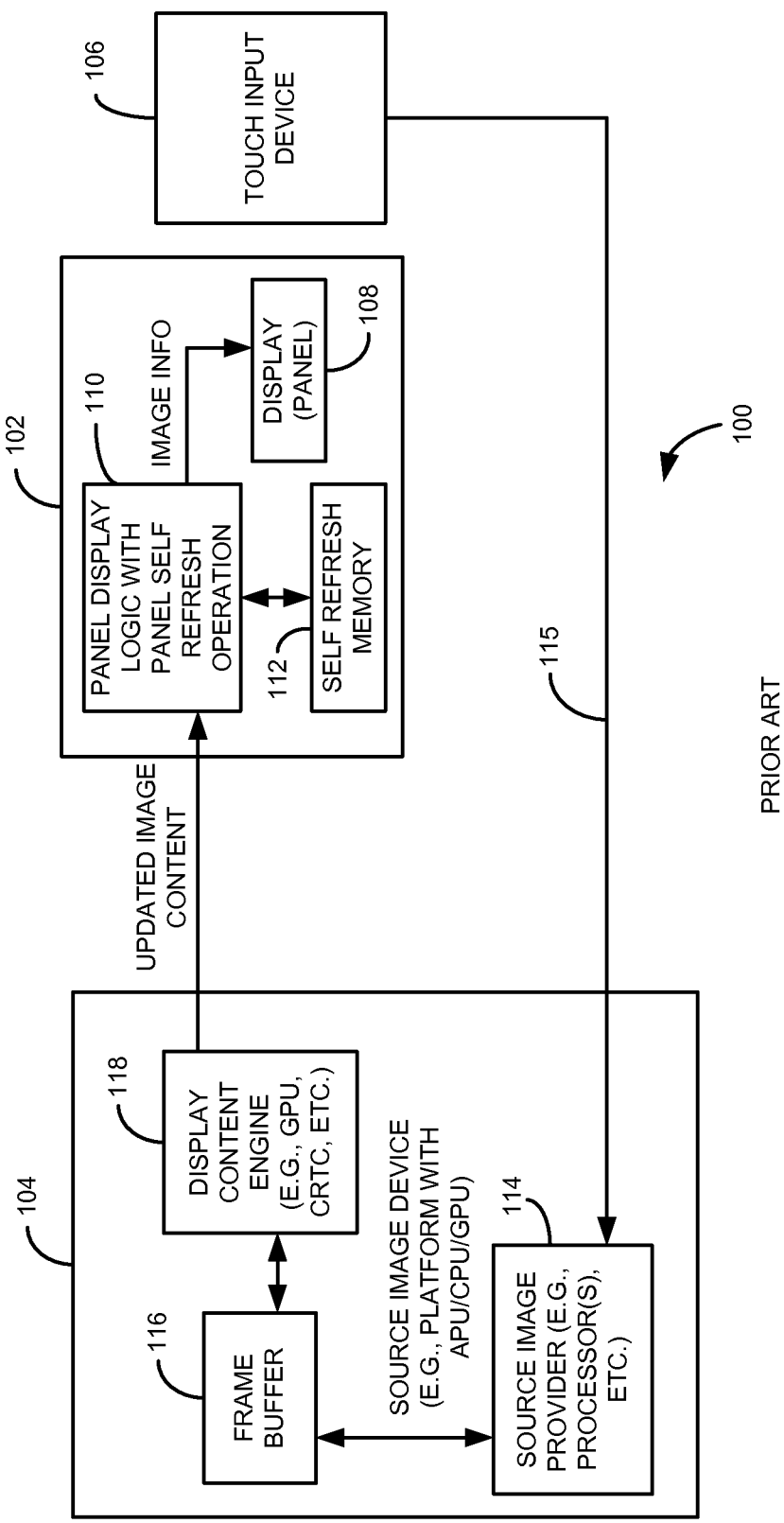
FIG. 1 is a functional block diagram of a prior art computing system.

Briefly, in one embodiment, an apparatus (e.g., a smart phone or tablet) and a method for responding to user input by way of a user interface for an apparatus that employs a display (e.g., a touch panel display of a smart phone or tablet) provide near-instantaneous user feedback in response to detecting user input associated with the display during a static screen condition on the display, such as a user's touch input to the display, by using logic local to the display to generate a change in displayed image content or a change in audio content output by the apparatus. The near-instantaneous user feedback may be, for example, provided on the order of 10 ms after the user's touch input. The logic local to the display may include panel display logic and user feedback generation logic as described herein, and the panel display logic and user feedback generation logic may be local to the display, in one example, because the panel display logic and/or the user feedback generation logic include processing capability, including in some examples graphics processing capability or even a GPU, but are not, for example, located on the motherboard of the computing device and are not, for example, responsible for fully processing any user input that would conventionally necessitate a change to the image content displayed on the display.

A static screen condition occurs on the display, for example, when the source image provider, and therefore the DCE, stops providing updated image content for display on the display for a particular period of time, such as because no user inputs (e.g., touch input selections of icons on the display) are received that necessitate changes to the image content displayed on the display. The particular period of time without updated image content that constitutes the static screen condition may be any suitable period of time, such as, for example, a particular amount of time (which may be predetermined, e.g., preconfigured for the smart phone, tablet, or other apparatus) during which a user makes no selections on the touch screen. In another example, the particular amount of time without updated image content that constitutes the static screen condition may be a particular (e.g., predetermined) amount of time during which the user makes no selections on a keyboard (not shown) or other input device (not shown) of the smart phone, tablet, or other apparatus. During the static screen condition, the most recent image content provided to the panel display logic using the DCE is displayed on the display as a static image using the panel display logic and self refresh memory local to the display.

In response to detecting the user input, the method and apparatus provide user feedback by, in one example, determining a first type of change to be incorporated to the static image, and incorporating the first type of change to the static image while the source image provider is in a reduced power mode.

In one example, the source image provider may be put into the reduced power mode when the static screen condition occurs, and a standby power may be available to the source image provider in the reduced power mode instead of maintaining the full supply of power to the source image provider that is needed for the source image provider to provide updated image content. For example, the reduced power mode may be one of several modes that are commonly referred to as "sleep modes" or lower power modes. The method and apparatus may further communicate control information to the source image provider, and receive from the source image provider updated image content based on the communicated control information. If desired, the method and apparatus may provide the user feedback while the source image provider prepares to provide the updated image content based on the communicated control information.

The updated image content may, for example, further incorporate the first type of change to the static image. For example, the updated image content may include image content that continues where the user feedback "left off," such as where providing the user feedback involves performing a zoom-in operation of the static image or a portion thereof and the updated image content continues the zoom-in operation from where the providing of the user feedback "left off." Alternatively, the updated image content may incorporate a second type of change to the static image that is different from the first type of change incorporated to the static image by way of the user feedback, such as including a new window displayed on a portion of the display that corresponds to the user's selection of an icon via a touch input when the user feedback in such a situation may have included, for example, an overlay of an hourglass indicating that the source image provider was preparing to provide the updated image content (the new window) corresponding to the user's selection of the icon. In yet another example, the method and apparatus may receive from the source image provider new image content based on the communicated control information.

In one example, the apparatus may include the display. In another example, the method and apparatus may communicate power control information to power management logic so as to cause the source image provider to exit the reduced power mode in order to provide the updated image content. The apparatus may include the source image provider and the power management logic. In still another example, the apparatus may include panel display logic, and the apparatus may provide the static image with the first type of change incorporated to the panel display logic so that the user feedback is displayed on the display.

In one example, incorporating the first type of change to the static image displayed on the display includes incorporating a type of change selected from the group consisting of a circle (e.g., a ripple ring) corresponding to a location of the detected user input, a visual indication that the source image provider is preparing to provide the updated image content, a rotation of a portion of the static image, a change in color of a portion of the static image, a popup window, a scrolling of the static image, a zooming in of the static image, and a zooming out of the static image.

Furthermore, in an example, receiving the updated image content from the source image provider includes receiving updated image content selected from the group consisting of a new image corresponding to a user selection indicated by the detected user input, a zoomed-in version of the static image relative to a zooming in of the static image performed while providing the user feedback, a zoomed-out version of the static image relative to a zooming out of the static image performed while providing the user feedback, and a scrolled version of the static image relative to a scrolling of the static image performed while providing the user feedback.

Among other advantages, for example, by providing such immediate user feedback that is, in some embodiments, generated locally to and displayed on the display, while the source image provider is in the reduced power mode, the disclosed methods and apparatus allow the source image provider and, in some examples, other components of the source image device, to be put into the reduced power mode during the static screen condition and, in response to detection of the user input, be restored to a power mode that permits the source image provider to provide updated image content, without the user perceiving the methods and apparatus as being unresponsive to the user's input. Thus, an APU, CPU, GPU, and/or, for example, one or more other processors on a motherboard of the computing device that are primarily responsible for providing updated image and/or audio content need not provide the near-instantaneous user feedback.

In the absence of such immediate and locally-generated user feedback as provided by the example embodiments disclosed herein, much more rigorous design constraints would have to be satisfied in order to be able to put, for example, a source image provider into such a reduced power mode during a static screen condition and then restore the source image provider to a power mode or level needed to provide updated image content quickly enough to maintain a user's sense of responsiveness to his or her input.

As another example advantage, putting the source image provider into the reduced power mode during the static screen condition can also increase system battery life, as a reduced amount of power is being consumed by a component (e.g., the source image provider) that is not providing new output data.

Other advantages of the methods, apparatus, and other embodiments described herein will be recognized by those of ordinary skill in the art.

Figure 2:
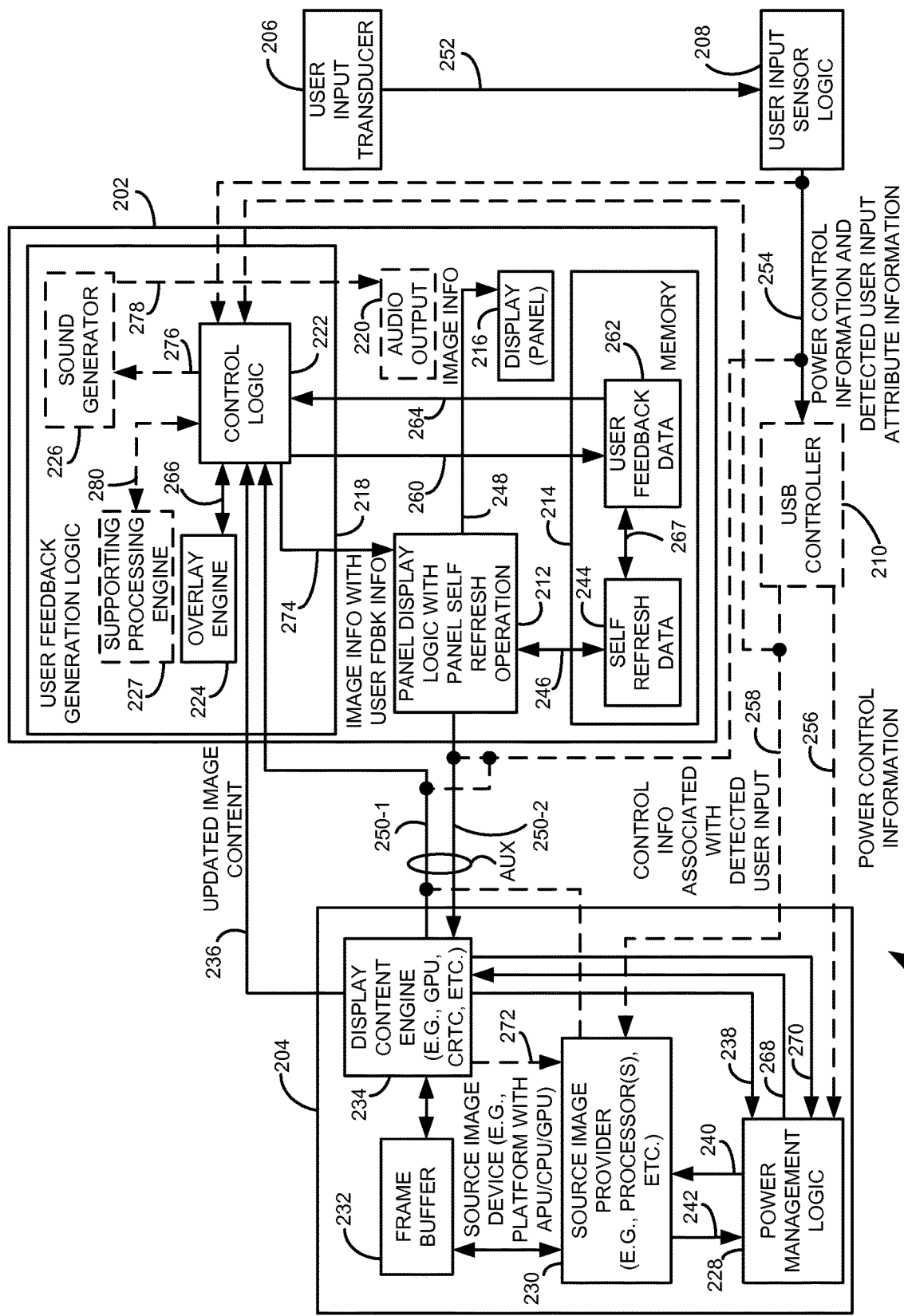
FIG. 2 is a functional block diagram illustrating an example of a computing system for providing user feedback via a user interface in response to detecting a user input during a static screen condition on the display, in accordance with an example set forth in the disclosure.

FIG. 2 is a functional block diagram illustrating an example of a computing system 200 for providing more immediate user feedback via a user interface (e.g., on a display) in response to detecting a user input associated with the display, such as a touch input, during a static screen condition on • the display. In the examples shown and described herein, the computing system 200 is any suitable computing system such as but not limited to a smart phone, tablet, or other handheld computer; a laptop or desktop computer; a digital television; or any other computing system that employs a display. Additionally, while the computing system 200 and the various methods described herein are explained primarily with reference to touch inputs, it will be understood that the features described herein may also be used to provide user feedback as described in response to other types of user input, such as user inputs via a mouse, a stylus, or any other suitable user input.

The computing system 200 includes a user interface subsystem 202, a source image device 204, a user input transducer 206, user input sensor logic 208, and a universal serial bus (USB) controller 210. The user interface subsystem 202 includes panel display logic 212, a memory 214, and a display 216, which may be the display 108 or a similar display, and which may be integrated with any suitable touch screen, such as but not limited to a liquid crystal display (LCD) touch screen panel, a plasma touch screen panel, or a touch screen using cathode ray tube (CRT) technology. In some embodiments, the computer system 200 may be provided (e.g., made, sold, etc.) without the display 216 and/or the touch input transducer 206, and may provide user feedback for display on a display in response to a touch input to a touch input transducer that is to be used with the computer system 200, for example. For ease of explanation, however, the computer system 200 will be described as a system that includes both the display 216 and the touch input transducer 206.

The user interface subsystem 202 also includes user feedback generation logic 218 to allow the user interface subsystem 202 to provide user feedback on the display 216 independently of the source image device 204 providing updated image content for display on the display 216, such as while various components of the source image device 204 are in a reduced power mode as described below. If desired, the user feedback may additionally or alternatively be provided by other methods, such as through an audio output 220. It will be understood that the user interface subsystem 202 may thus provide a user interface that includes the display 216 and may also include the audio output 220. As shown in FIG. 2, the user feedback generation logic 218 may include control logic 222 and may also include an overlay engine 224. In some examples, the user feedback generation logic 218 may also include a sound generator 226 and/or a supporting processing engine 227. The supporting processing engine 227 may include, for example, a scaler, a rotation engine, and/or a shader, as further described below. In any event, the features of the user feedback generation logic 218 may, in some examples, be incorporated into any suitable processor or, for example, any suitable GPU, such as but not limited to one or more suitable processors or GPUs sold by Advanced Micro Devices, Inc. (AMD) of Sunnyvale, Calif.

The source image device 204 includes power management logic 228, a source image provider 230, a frame buffer 232, and a DCE 234. The source image device 204 may be or may include, for example, an accelerated processing unit (APU). Such an APU may be an APU as sold by Advanced Micro Devices, Inc. (AMD) of Sunnyvale, Calif. or any other suitable APU. As known in the art, an APU may also be known as an advanced processing unit. As further known in the art, an APU includes one or more central processing unit (CPU) cores and one or more graphics processing unit (GPU) cores on the same die. However, the source image device 204 may be or may include any suitable computing platform or processor(s), such as but not limited to a computing platform that includes one or more digital signal processors (DSPs), a central processing unit (CPU), a graphics processing unit (GPU), both a CPU and a GPU but not an APU, one or more application-specific integrated circuits (ASICs), or any suitable structure. Such a DSP, CPU, GPU, ASIC, and/or any suitable structure may be, for example, a DSP, CPU, GPU, or ASIC as sold by Advanced Micro Devices, Inc. of Sunnyvale, Calif., or any other suitable processor(s).

The source image provider 230, which may be or may include, for example, one or more processor(s) of the source image device 204, receives and provides power management and feedback signals to and from the power management logic 228 as further described below, and provides updated image content to the frame buffer 232 when the source image provider 230 is in a power mode or state that permits the source image provider 230 to do so. The DCE 234, when supplied with the requisite power, receives the updated image content from the frame buffer 232 and provides the updated image content via a communication link 236 to the user interface subsystem 202 for display on the display 216. Each of the communication link 236 and other communication links that will be described herein may be or may include, for example, a bus, a single line, a trace, a wireless link, or any suitable communication link. The DCE 234 may be or may be included within, for example, a GPU or cathode ray tube controller (CRTC), or any other suitable structure.

The DCE 234 also provides static screen detection information 238 to the power management logic 228. When a particular period of time corresponding to a static screen condition has passed without the DCE 234 receiving updated image content from the source image provider 230 via the frame buffer 232 and providing such updated image content to the user interface subsystem 202 via the communication link 236, a static screen condition is occurring on the display 216. The static screen detection information 238 provided by the DCE 234 indicates, for example, whether the particular period of time corresponding to a static screen condition has passed and that a static screen condition is thus occurring.

When the DCE 234 provides static screen detection information 238 indicating that a static screen condition is occurring on the display 216, the DCE 234 may enter a reduced power mode, and the power management logic 228 provides a power management command via a source image provider power command communication link 240 to the source image provider 230 to cause the source image provider 230 to enter a reduced power mode as well. As discussed in further detail below, during the static screen condition on the display 216, the panel display logic 212 maintains the most recent image content provided from the DCE 234 via the communication link 236 as a static image on the display 216.

In one example, in the reduced power mode of the source image provider 230, a standby power is available to the source image provider 230 (e.g., is available to be asserted to the source image provider 230) instead of maintaining the full supply of power to the source image provider 230 that is needed for the source image provider 230 to provide updated image content. More specifically, with reference to the Advanced Configuration and Power Interface (ACPI) specification, which is a power management specification as known in the art, the reduced power mode is, in some examples, the "S3" state, the "D3 hot" state, the "D3 cold" state, or another suitable state in which less power is available to the source image provider 230 than that available in states such as the foregoing example states. In one example, the power management logic 228 monitors the power mode of the source image provider 230 via a source image provider power mode feedback communication link 242, and adjusts the power management command as necessary.

The panel display logic 212 writes image content previously received from the DCE 234 via the communication link 236 and the control logic 222 to a self refresh data portion 244 of the memory 214 via a self refresh data read/write communication link 246. When the DCE 234 stops providing updated image content via the communication link 236 during a static screen condition, the DCE 234 instructs the panel display logic 212 to begin reading stored image content previously received from the DCE 234 from the memory 214, such as by sending a suitable signal via the communication link 236 which is then sent to the panel display logic 212 from the control logic 222, or by sending a suitable signal directly to the panel display logic 212 (not shown in FIG. 2). In particular, the panel display logic 212 reads the stored image content from the self refresh data portion 244 of the memory 214 via the self refresh data read/write communication link 246 and provides the read image content to the display 216 via an image information communication link 248. In this manner, the panel display logic 212 maintains the most recently received image content from the DCE 234 as a static image on the display 216.

As discussed in detail below, the user feedback generation logic 218 allows the user interface subsystem 202 to provide more immediate user feedback on the display 216, and/or via the audio output 220, in response to detecting a user input associated with the display 216 and independently of the source image provider 230 providing updated image content for display on the display 216. That is, without the source image provider 230 providing updated image content for display on the display 216, the user feedback generation logic 218 allows the user interface subsystem 202 to provide user feedback on the display 216 and/or via the audio output 220 prior to the source image provider 230 powering back up and providing updated images. In some examples, the user feedback is provided based on one or more attributes of the user input. The user input may be a touch input, and the user input and its one or more attributes may be detected by the user input sensor logic 208. In other examples, the user input may be an input made via a mouse, via a stylus, or any other suitable user input, and such user input and its one or more attributes may be detected by the user input sensor logic 208.

As further discussed below, auxiliary communication links 250 provide additional communication between the user interface subsystem 202 and the source image device 204. In particular, an auxiliary communication link 250-1 may provide communication between the DCE 234 and the control logic 222, such as communication of any desired and suitable control information from the DCE 234 to the control logic 222 for use in processing the image content provided from the DCE 234 to the control logic 222. Additionally, an auxiliary communication link 250-2 may provide communication between the panel display logic 212 and the DCE 234, such as any desired and suitable information from the panel display logic 212 to the DCE 234 regarding the capabilities of the display 216, such as but not limited to extended display identification data (EDID), which as known in the art is a data structure used to describe the capabilities of a display to an image source.

Figure 3:
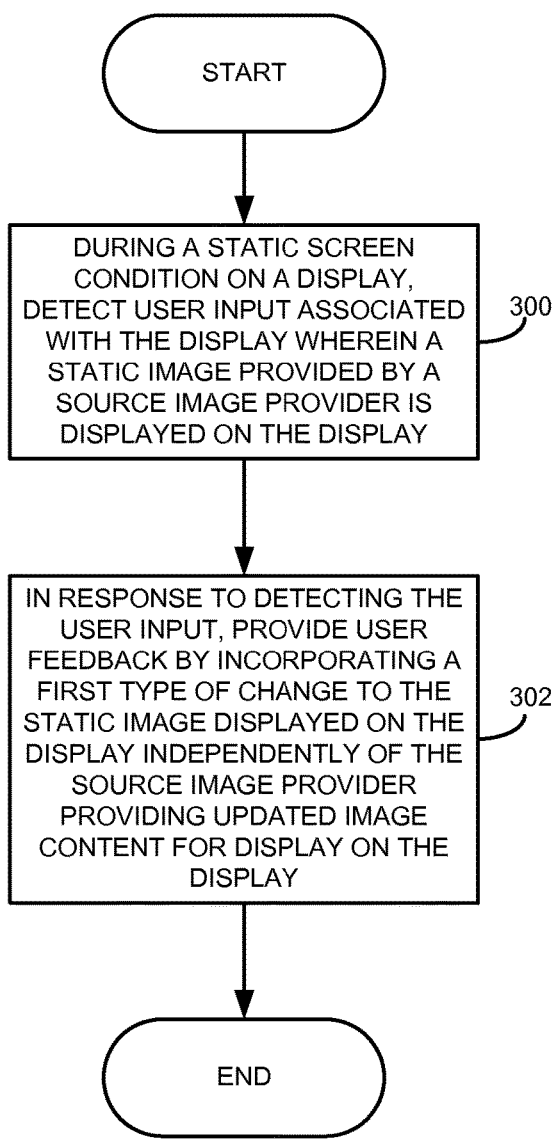
FIG. 3 is a flowchart illustrating one example of a method for responding to user input by way of a user interface for an apparatus that employs a display, in accordance with an example set forth in the disclosure.

Referring also to FIG. 3, which is a flowchart illustrating one example of a method for responding to user input by way of a user interface for an apparatus that employs a display, the computer system 200 and its operation will be described further. For ease of explanation, features of the method illustrated in FIG. 3 will be described with reference to features of the computer system 200 and vice versa. However, it will be understood that the method illustrated in FIG. 3 may be implemented by or in conjunction with any suitable system, and that the computer system 200 may implement other suitable methods for responding to user input by way of a user interface for an apparatus that employs a display and other suitable methods in general.

As shown in block 300, the method includes, during a static screen condition on the display 216 wherein a static image provided by the source image provider 230 is displayed on the display 216, detecting user input associated with the display 216. In one example where the display 216 is integrated with a touch screen, the user input associated with the display 216 is a touch input to the user input transducer 206, which is, for example, the glass layer of the touch screen that the user's finger or fingers make contact with. The user input transducer 206 converts the touch input to an electrical user input signal 252, and the user input sensor logic 208 detects the user input by detecting the electrical user input signal 252.

As shown in block 302, the method further includes, in response to detecting the user input, providing user feedback by incorporating a first type of change to the static image displayed on the display 216 independently of the source image provider 230 providing updated image content for display on the display 216.

The user feedback may be provided independently of the source image provider 230 providing updated image content for display on the display 216 for any suitable or desired reason, including, for example, in a situation where the user input does not correspond to any change to the content on the display 216. For example, the user may provide a touch input to the user input transducer 206 that does not correspond to any valid command, and the computing system 200 may provide user feedback, such as overlaying an error icon on the static image, without the source image provider 230 providing any updated image content for display on the display 216. In this situation, if the source image provider 230 were in a reduced power mode, the source image provider 230 would not need to exit the reduced power mode. As another example, in response to a touch input that does not correspond to any valid command, the computing system 200 may, independently of the source image provider 230 providing any updated image content relative to the static image, overlay an icon on the static image indicating that the computing system 200 is ready to accept valid inputs.

Figure 5:
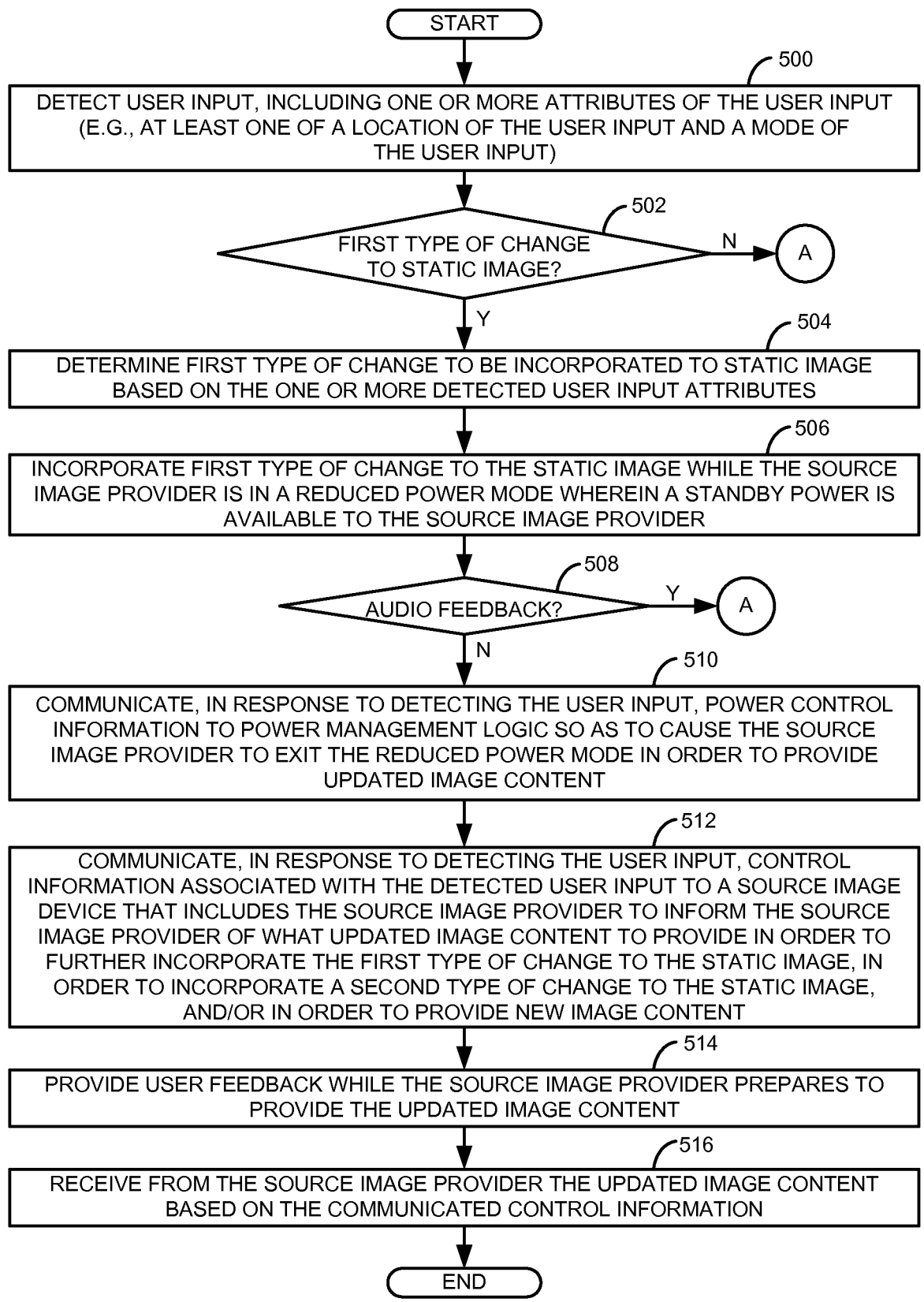
FIGS. 5 and 6 are flowcharts illustrating yet another example of a method for responding to user input by way of a user interface for an apparatus that employs a display, in accordance with an example set forth in the disclosure.
Figure 6:
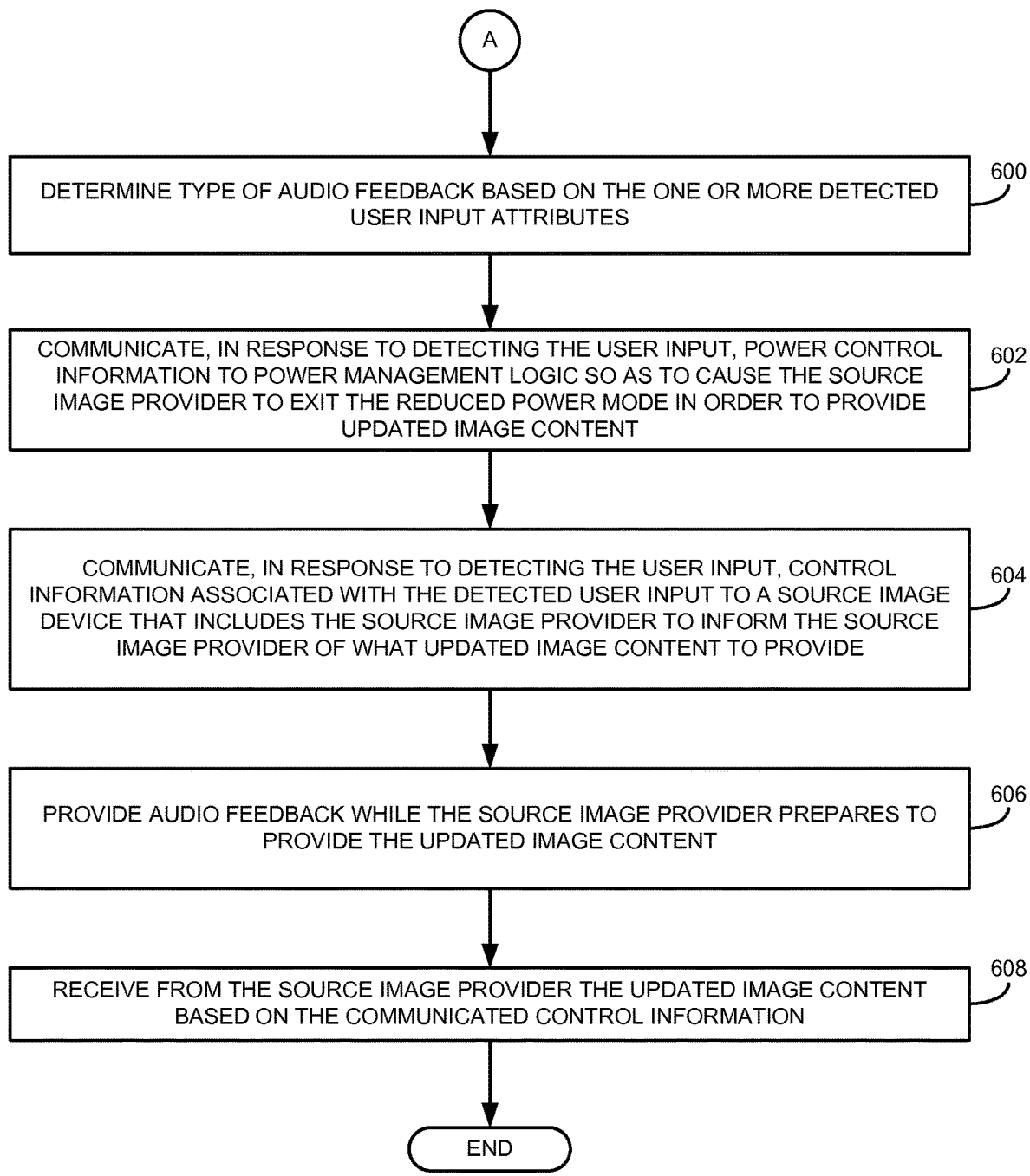

Additionally or alternatively, as further discussed with respect to FIGS. 5 and 6, the user feedback may be a suitable audio output via the audio output 220 indicating that the user's input command was invalid. Thus, if the source image provider 230 were in a reduced power mode, the user would know he or she made an invalid input command and would not need the source image provider 230 to exit the reduced power mode and provide a visual indication that the input command was invalid.

As another example, and as further shown in FIG. 4 and described in detail below, the user feedback may be provided independently of the source image provider 230 providing updated image content for display on the display 216 so that the source image provider 230 has time to exit a reduced power mode and provide updated image content that the source image provider 230 needs to provide for display on the display 216 without the user perceiving the computing system 200 as being unresponsive to his or her input. Other example situations and reasons why user feedback may be provided independently of the source image provider 230 providing updated image content on the display 216 will be recognized by one of ordinary skill in the art.

Figure 4:
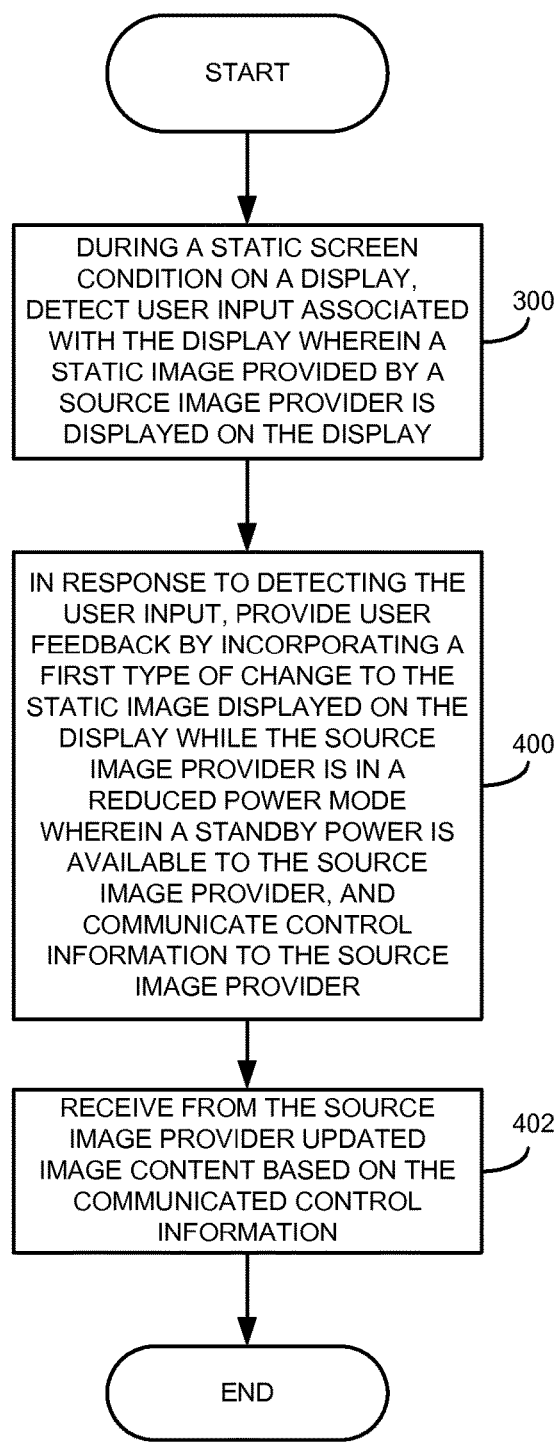
FIG. 4 is a flowchart illustrating another example of a method for responding to user input by way of a user interface for an apparatus that employs a display, in accordance with an example set forth in the disclosure.

The blocks 300 and 302 are further illustrated and described with respect to FIGS. 4-8. In particular, FIG. 4 is a flowchart illustrating another example of a method for responding to user input by way of a user interface for an apparatus that employs a display. As with the example method illustrated in FIG. 3, the method includes, during a static screen condition on the display 216 wherein a static image provided by the source image provider 230 is displayed on the display 216, detecting user input associated with the display 216, as shown in block 300. As shown in block 400, the method further includes, in response to detecting the user input, providing user feedback by incorporating a first type of change to the static image displayed on the display 216 while the source image provider 230 is in a reduced power mode wherein a standby power is available to the source image provider 230, and communicating control information to the source image provider 230.

As shown in block 402, the method further includes receiving from the source image provider 230 updated image content based on the communicated control information. The updated image content is, in one example, received by the user feedback generation logic 218 via the communication link 236.

Referring to FIGS. 5 and 6, which are flowcharts illustrating yet another example of a method for responding to user input by way of a user interface for an apparatus that employs a display, the method includes detecting the user input, including, in one example, one or more attributes of the user input, as shown in block 500. For example, the user input sensor logic 208 detects the user input and one or more attributes of the user input by detecting the electrical user input signal 252. In particular, the user input sensor logic 208 may detect at least one of a location of the user input associated with the display 216 and a mode of the user input associated with the display 216. The user input associated with the display 216 is, for example, a touch input to the user input transducer 206, but may alternatively be a mouse input, a stylus input, or any suitable user input. The location of a touch input is, for example, the location of the touch input relative to the content of a static image displayed on the display 216, and the mode of a touch input is, for example, the physical action the user took while making the touch input, such as but not limited to a single tap, a double tap, a press and hold input, a swiping motion in a particular direction across the user input transducer 206, a two-finger touch, a two-finger squeeze, a two-finger stretch, a two-finger swipe, a three-finger touch, a three-finger squeeze, a three-finger stretch, a three-finger swipe, and so on.

As shown in block 502, the method includes determining whether the user feedback is to be provided by incorporating a first type of change to the static image displayed on the display 216. In one embodiment, this determination is made by the control logic 222 of the user feedback generation logic 218. If the computing system 200 does not support providing audio feedback in order to provide user feedback, the block 502 may be omitted.

The control logic 222 may receive the detected user input attribute information in any of a number of suitable ways. In one example, in response to detecting the electrical user input signal 252, the user input sensor logic 208 generates an output signal 254 including power control information to be used to control the power management logic 228 and including the detected user input attribute information. In one embodiment, the signal 254 is provided to the USB controller 210 which, in response to receiving the signal 254, output signals 256 and 258. The signal 256 includes, for example, the power control information that was included in the signal 254, and will be further discussed below. The signal 258 includes control information associated with the detected user input. In this example, the control information associated with the detected user input is or includes the detected user input attribute information. The USB controller 210 generates the signal 258 by, for example, conforming the detected user input attribute information within the signal 254 to a protocol, which may in some cases be a proprietary protocol, that is both understood by the user feedback generation logic 218 and suitable for use in controlling the source image device 204, as further discussed below.

The signal 258 including the detected user input attribute information is then provided to both the control logic 222 and the source image provider 230, with the communication of the signal 258 from the USB controller 210 to the source image provider 230 being shown in a solid line in FIG. 2 and the communication of the signal 258 from the USB controller 210 to the control logic 222 being shown in a dashed line in FIG. 2.

Alternatively, if desired, the signal 254 is provided directly to the control logic 222 in order to provide the detected user input attribute information to the control logic 222, as shown via the dashed line connecting the output of the user input sensor logic 208 to the control logic 222 in FIG. 2. In this embodiment, the signal 258 is not provided to the control logic 222. In yet another example, the USB controller 210 and the signals 256 and 258 may be omitted and the signal 254 may be provided directly to the control logic 222 in order to provide the control logic 222 with the detected user input attribute information. In this example, while not shown as such in FIG. 2, the signal 254 may also be directly provided to the power management logic 228 and the source image provider 230.

The control logic 222 may be, for example, one or more state machines, one or more processors, or any other logic suitable for use in the computer system 200 and/or the methods described herein. In one embodiment, before the user input is received and detected, the control logic 222 is programmed to determine, once the control logic 222 receives the detected user input attribute information, whether the user feedback is to be provided by incorporating a first type of change to the static image displayed on the display 216. Once the control logic 222 receives the detected user input attribute information, if the outcome of this determination is that the user feedback is to be provided by incorporating a first type of change to the static image displayed on the display 216, the method then proceeds to the block 504. If the outcome of this determination is that the user feedback is not to be provided by incorporating a first type of change to the static image displayed on the display 216, the method then proceeds to the block 600, which is shown in FIG. 6 with the marker "A" that appears on both FIGS. 5 and 6 linking the blocks 502 and 600. The user feedback will then be provided as audio feedback as discussed with respect to FIG. 6.

With continued reference to the block 502, the control logic 222 may be programmed to determine whether to incorporate a first type of change to the static image based on any desired and suitable criteria. For example, if the user selects, via a touch input to the user input transducer 206, an option to play music content or video content stored in the computer system 200, the control logic 222 may be programmed to determine not to incorporate any change to the static image. As shown in FIG. 6, the user feedback would then, in this example, be provided as audio feedback, such as a chime, to indicate that the computer system 200 is responding to the user's selection and is preparing to play the music content or video content after the source image provider 230 exits the reduced power mode.

On the other hand, if the user selects, for example, an option to view pictures stored in the computer system 200, an option to view his or her calendar as stored in the computer system 200, an option to view notes to himself or herself as stored in the computer system 200, etc., the control logic 222 may be programmed to determine that a first type of change is to be incorporated to the static image. In yet another example, the control logic 222 may be programmed to determine that any detected user input is to result in audio feedback and not in the user feedback generation logic 218 incorporating a change to the static image. Other suitable implementations will be recognized by one of ordinary skill in the art.

In the event that the method proceeds to the block 504, the method includes determining the first type of change to be incorporated to the static image based on the one or more detected user input attributes. The control logic 222 may be programmed to perform this determination in any desired and suitable manner. The first type of change to be incorporated to the static image may be based on the location of the touch input. For example, the control logic 222 may be programmed to determine that the first type of change to be incorporated to the static image is an overlay of an hourglass, a circle corresponding to the location of the touch input, a moving icon, a pop-up window indicating the particular function associated with a predefined "hot key" touched by the user, or other suitable content on the static image at the location of the touch input. The changed image with the immediately-generated overlay provides a visual indication to the user that the touch input was received and that the computer system 200 is preparing to respond fully to the touch input.

In some examples, the first type of change to be incorporated to the static image also or alternatively depends upon the mode of the touch input. For example, if the user performs a double tap of an icon corresponding to a news article, the double tap may ultimately cause the source image provider 230 to provide a new image including a scrollable version of the entire news article. In the same example, a single tap may cause the source image provider 230 to provide updated image content constituting an enlarged version of the tapped icon. In this example, the control logic 222, upon detecting that the mode of the touch input is a double tap, may determine that the first type of change to be incorporated to the static image is the overlay of a pop-up message at the location of the double-tapped icon. The pop-up message indicates that the computer system 200 (e.g., the source image provider 230 in conjunction with other components described herein) is preparing to update the image content on the display 216 in response to the specific touch input (e.g., the double tap) at the specific location corresponding to the double-tapped icon for the news article.

In the case of a single tap, the control logic 222 may instead determine that the first type of change to be incorporated to the static image is the overlay of a circle at the location of the single-tapped icon in order to indicate to the user that the computer system 200 is preparing to update the image content on the display 216 in response to the specific touch input (e.g., the single tap) at the specific location corresponding to the tapped icon. Other suitable situations in which the location and/or mode of a touch input to the user input transducer 206 may be used to determine the first type of change to be incorporated to the static image will be recognized by one of ordinary skill in the art, and several additional examples are described below.

In an alternative embodiment, determining the first type of change to be incorporated to the static image does not depend upon the attributes of the detected user input. For example, the control logic 222 may be programmed to determine that any detected user input is to result in an overlay of an hourglass or other suitable icon or indication at a predetermined location, independent of the actual location of the user input, on the static image. Such overlaid content would indicate to the user that the touch input was received and that the computer system 200 is preparing to fully respond to the touch input. In such an embodiment, because any detected user input would result in the same type of change being incorporated to the static image, the block 502 and the audio output 220 of the computer system 200 (and the block 508, which is further described below) may be omitted.

In still further embodiments, and as further described with reference to FIGS. 7 and 8, the first type of change to be incorporated to the static image may include one or more of scaling of image content within the static image, rotation of image content within the static image, shading of image content within the static image, or any other suitable type of change. The control logic 222 may, again, make the determination of the first type of change to be incorporated to the static image based on any suitable criteria including one or more attributes of the detected user input. For example, the control logic 222 may be programmed to determine that the first type of change to be incorporated to the static image is a zooming in (requiring scaling) of the static image in response to a two-finger stretch, a zooming out (requiring scaling) of the static image in response to a two-finger squeeze, a rotation (such as a flip) of a tile or other icon within the static image that has been touched by the user, a change in color (such as a flash) of a tile or other icon within the static image that has been touched by the user, a scrolling of the static image in response to an appropriate swiping input made by the user, etc.

As shown in block 506, the method further includes incorporating the first type of change to the static image while the source image provider 230 is in the reduced power mode wherein a standby power is available to the source image provider 230. For example, if the first type of change to be incorporated to the static image is an overlay of particular content on the static image at a particular location such as described above, the method includes overlaying that particular content at that particular location.

More particularly, the control logic 222, after determining the particular content to be overlaid on the static image, makes a user feedback request on communication link 260 to a user feedback data portion 262 of the memory 214. In response, the control logic 222 receives user feedback data on communication link 264 that includes the particular content to be overlaid on the static image. The control logic 222 then communicates with the overlay engine 224 via a communication link 266 to indicate the content that is to be overlaid on the static image and where on the static image that content is to be overlaid, and the overlay engine 224 performs the overlay. The overlay engine 224 may be or may include any suitable processor(s) or processing capability. The overlay engine 224 overlays the content determined by the control logic 222 on the static image in order to incorporate the first type of change to the static image, and then sends the static image with the first type of change incorporated to the control logic 222 via the communication link 266.

In another example, if the first type of change to be incorporated to the static image also or alternatively includes one or more of scaling (e.g., zooming) of image content within the static image, rotation of image content within the static image, shading of image content within the static image, etc., the method includes performing such operations. In such cases, as further described below, the method may include retrieving data from the self refresh data portion 244 of the memory 214 in response to a user feedback request made on the communication link 260. Such data may be retrieved using a read/write communication link 267 that provides communication between the self refresh data portion 244 and the user feedback data portion 262. The block 506, including such operations other than overlays, is further described with reference to FIGS. 7 and 8.

As shown in block 508, the method further includes determining whether the user feedback to be provided also includes audio feedback. This determination may be made by the control logic 222 based on any desired and suitable criteria, such as but not limited to criteria that are the same as or similar to those discussed above with respect to the block 502. If it is determined that the user feedback to be provided also includes audio feedback, the method proceeds to the block 600, which is shown in FIG. 6 with the marker "A" that appears on both FIGS. 5 and 6 linking the blocks 508 and 600. If it is determined that the user feedback to be provided does not also include audio feedback, the method proceeds to the block 510. Additionally, if the computing system 200 does not support providing audio feedback in order to provide user feedback, the block 508 may be omitted.

In the event that the method proceeds to the block 510, the method further includes communicating, in response to detecting the user input, power control information to the power management logic 228 so as to cause the source image provider 230 to exit the reduced power mode in order to provide updated image content. In one example, the power control information is included in the signal 256 output by the USB controller 210, as shown in FIG. 2. In another example where the USB controller 210 is omitted, the power control information is included in the signal 254 output by the user input sensor logic 208 and provided directly to the power management logic 228.

In response to receiving the power control information, the power management logic 228 provides a power management command via the source image provider power command communication link 240 to the source image provider 230 to cause the source image provider 230 to exit the reduced power mode. For example, the power management command causes the power to the source image provider 230 to increase to a mode or state that allows the source image provider 230 to provide updated image content, such as the "S0" state defined in the ACPI specification, whether by appropriate switching within the source image provider 230 or by other suitable means. The power management logic 228 may monitor the power mode of the source image provider 230 via the source image provider power mode feedback communication link 242.

In one example, the power management logic 228 also provides a power management command on a DCE power command communication link 268 to the DCE 234 in order to increase the power to the DCE 234 to a mode or state, such as the S0 state defined in the ACPI specification, that allows the DCE 234 to provide the updated image content to the user feedback generation logic 218, and specifically the control logic 222, via the communication link 236. The power management logic 228 may monitor the power mode of the DCE 234 via a DCE power mode feedback communication link 270 and adjust the power management command on the DCE power command communication link 268 as needed.

As shown in block 512, the method further includes communicating, in response to detecting the user input, control information associated with the detected user input to the source image device 204 (which includes the source image provider 230) to inform the source image provider 230 of what updated image content to provide. As noted above, the USB controller 210 may provide the signal 258 to the source image provider 230 as the control information associated with the detected user input. Alternatively, as further noted above, the signal 254 may be provided to the source image provider 230 in order to provide the control information associated with the detected user input, where such control information associated with the detected user input is or includes the detected user input attribute information that is included within the signal 254. Furthermore, in some examples where the signal 254 is provided to the source image device 204 or any component thereof, such as the source image provider 230, the signal 254 may alternatively be provided to the source image device 204 or component(s) thereof by an operating system associated with the user interface subsystem 202.

In yet another embodiment, the signal 254 is coupled to the auxiliary communication links 250-1 and 250-2, as also shown in dashed lines in FIG. 2, instead of being input to the control logic 222, the power management logic 228, and the source image provider 230. In this embodiment, the detected user input attribute information is provided to the control logic 222 via the coupling of the signal 254 to the auxiliary communication link 250-1. Additionally, the DCE 234 may process the data received over the auxiliary communication link 250-1 in order to provide control information associated with the detected user input to the source image provider 230 via a communication link 272. In this example, such control information is or includes the detected user input attribute information that was originally included within the signal 254.

In order to couple the signal 254 to the auxiliary communication links 250-1 and 250-2, the user input sensor logic 208 may conform the signal 254 to a protocol that allows the information within the signal 254 to be communicated over the auxiliary communication links 250-1 and 250-2 in addition to the information that is already being communicated over the auxiliary communication links 250-1 and 250-2, and that allows the information within the signal 254 to be processed as needed by the control logic 222 and the DCE 234 (which receives the information in the signal 254 via the auxiliary communication link 250-2). For example, the signal 254 may be conformed to a protocol that utilizes extended display identification data (EDID).

With continued reference to the block 512, regardless of the particular manner used to communicate the control information associated with the detected user input to the source image provider 230, the source image provider 230 determines what updated image content to provide based on the control information associated with the detected user input. According to an embodiment, the updated image content to be provided is one or more of the following: (i) image content that further incorporates the first type of change to the static image, (ii) image content that incorporates a second type of change to the static image, and/or (iii) new image content. The communicated control information associated with the detected user input informs the source image provider 230 of what updated image content to provide in order to implement one or more of these options (i), (ii), and/or (iii).

The source image provider 230 may determine that updated image content that further incorporates the first type of change to the static image is to be provided when, for example, the touch input corresponds to a zooming in of the static image, a zooming out of the static image, or a scrolling of the static image, for example. For example, the touch input detected by the user input sensor logic 208 may be a two-finger stretch or squeeze at a particular location on the user input transducer 206, or a swiping motion at a location on the user input transducer 206 that corresponds to a scroll bar of the static image displayed on the display 216. The control logic 222 will, based on the detected user input attribute information, cause a first type of change to be incorporated to the static image that includes the beginning of such zooming or scrolling, as further described with reference to FIGS. 7 and 8. The source image provider 230 also determines, based on the control information associated with the detected user input, what updated image content to provide in order to continue such a zooming or scrolling operation relative to where the change incorporated to the static image by the control logic 222 "left off."

For example, the source image provider 230 may process the control information associated with the detected user input to determine how much zooming or scrolling was performed and/or is to be performed by the control logic 222, and to then determine from what point to continue the zooming or scrolling and to what extent to continue the zooming or scrolling until the zooming or scrolling has been performed to the extent indicated by the user input. The source image provider 230 may continue such zooming or scrolling using its own processing capabilities, which as discussed above may include one or more suitable processors, which may be or may be included within a CPU and/or a GPU, an APU, or any suitable processing capability. In this manner, the updated image content will further incorporate the first type of change to the static image, e.g., will continue a zooming or scrolling that was the first type of change of the static image. Other types of user input that may cause the control logic 222 to incorporate a first type of change to the static image and the source image provider 230 to determine that the first type of change to the static image is to be further incorporated to the static image will be recognized by one of ordinary skill in the art.

The source image provider 230 may determine that updated image content that incorporates a second type of change to the static image is to be provided when, for example, the touch input is a tap to a location on the user input transducer 206 that corresponds to a tile icon on the static image displayed on the display 216. In such an example, the control logic 222 may cause a first type of change to be incorporated to the static image by rotating the tile icon or flashing the tile icon. However, the source image provider 230 may process the control information associated with the detected tap input and determine that the updated image content to be provided is an overlay of a small image on the static image, where the overlaid image contains, for example, a note the user previously wrote to himself or herself and stored in the computer system 200. Thus, the first type of change incorporated to the static image would be the rotation or flashing of the tile icon, but the source image provider 230 would determine that it is to provide updated image content by incorporating a second type of change to the static image; namely, the overlay of the small image of the note. Other suitable types of user input that may cause the control logic 222 to incorporate a first type of change to the static image and that may cause the source image provider 230 to be informed that it is to incorporate a second type of change to the static image will be recognized by one of ordinary skill in the art.

The source image provider 230 may determine that updated image content constituting new image content is to be provided when, for example, the touch input is a single tap input to a location on the user input transducer 206 corresponding to an icon representing the user's calendar as stored in the computer system 200. In such an example, the control logic 222 may cause a first type of change to be incorporated to the static image by, for example, causing an overlay of an hourglass on the static image at the location of the calendar icon. However, the source image provider 230 may process the control information associated with the detected tap input and determine that the updated image content to be provided is a full-screen image of the content in the user's stored calendar. Thus, the first type of change incorporated to the static image would be the overlay of the hourglass, but the source image provider 230 would determine that it is to provide updated image content by providing new image content; namely, the full-screen image of the content in the user's stored calendar. Other suitable types of user input that may cause the control logic 222 to incorporate a first type of change to the static image and that may cause the source image provider 230 to be informed that it is to provide new image content will be recognized by one of ordinary skill in the art.

As shown in block 514, the method further includes providing user feedback while the source image provider 230 prepares to provide the updated image content. While the various blocks of FIG. 5 and the other flowcharts herein have been shown in a particular sequential order, one of ordinary skill in the art will appreciate from the disclosure herein that the actions described by those blocks do not necessarily need to be performed in the order illustrated, and/or that the actions described by those blocks do not necessarily need to be performed in a sequential manner. For example, providing the user feedback while the source image provider 230 prepares to provide the updated image content is, in one example, performed by providing the user feedback while the source image provider 230 has not fully exited the reduced power mode. For example, the source image provider 230 may still be in the reduced power mode, in which case the action described by the block 514 may be performed substantially concurrently with the action described by the block 506 and/or the action described by the block 504. As another example, the source image provider 230 may be considered to be preparing to provide the updated image content because the source image provider 230 is still in the process of exiting the reduced power mode, such as by being in the process of transitioning from state S3 to S0. In this example, the action described by the block 514 may be performed concurrently with the action described by the block 510 and/or the action described by the block 512.

In any event, the control logic 222 may incorporate the first type of change to the static image as described above, and may communicate the resulting image information with user feedback information to the panel display logic 212 via a communication link 274.

When the panel display logic 212 receives image information with user feedback information via the communication link 274; that is, the static image with the first type of change incorporated to the static image, the panel display logic 212 provides this received image information with user feedback information to the display 216 via the image information communication link 248 for display on the display 216. When the user sees the first type of change incorporated to the static image, the user will know that his or her input was received and is being processed, and the user will not perceive the computer system 200 as being unresponsive while the source image provider 230, which was previously put into the reduced power mode when the static screen condition occurred, prepares to provide updated image content.

As shown in block 516, the method further includes receiving, from the source image provider 230, the updated image content based on the communicated control information. As discussed with respect to the block 512, the communication of the control information associated with the detected user input to the source image device 204 informs the source image provider 230 of what updated image content to provide. Once the source image provider 230 has exited the reduced power mode, such as by transitioning from ACPI state S3 to ACPI state S0, the source image provider 230 provides the updated image content to the frame buffer 232, which in turn provides the updated image content to the DCE 234 to be sent to the control logic 222 via the communication link 236. The control logic 222 then sends the updated image content to the panel display logic 212 via the communication link 274, and the panel display logic 212 causes the updated image information to be displayed on the display 216 in the same or a similar manner that the panel display logic 212 causes the display of image information with user feedback information.

With reference back to the blocks 502 and 508, if the method proceeds to the block 600 so that audio feedback may be provided, then as shown in the block 600 of FIG. 6, the method further includes determining the type of audio feedback to provide based on the one or more detected user input attributes. For example, if the user selects, via a touch input, an option to play video content, the control logic 222 may determine that the audio feedback to be provided is a chime to indicate that the computer system 200 is preparing to fully respond to the user's selection and to maintain the user's sense of responsiveness while the source image provider 230 prepares to provide the updated image content needed to provide the selected video content. The control logic 222 may then send a user feedback request via communication link 260 to the user feedback data portion 262 of the memory 214, and may receive user feedback data, such as sound data corresponding to the chime, from the memory 214 via the communication link 264.

As shown in blocks 602 and 604, the method further includes communicating, in response to detecting the user input, power control information to the power management logic 228 so as to cause the source image provider 230 to exit the reduced power mode in order to provide updated image content (block 602); and communicating, in response to detecting the user input, control information associated with the detected user input to the source image device 204 that includes the source image provider 230 to inform the source image provider 230 of what updated image content to provide (block 604). The actions described by the blocks 602 and 604 may be performed in a manner similar to the actions described by the blocks 510 and 512, respectively.

As shown in block 606, the method further includes providing the audio feedback while the source image provider 230 prepares to provide the updated image content. For example, the control logic 222 may be programmed to provide user feedback data corresponding to the determined type of audio feedback to be provided (e.g., sound data corresponding to a chime) to the sound generator 226 via a communication link 276 to cause the sound generator 226 to produce the desired audio output signal on a communication link 278 connected to the audio output 220. The sound generator 226 may be a speaker, a headphone jack, or any other suitable device that generates sound for output or enables the generation of sound for output, such as via a user's headphones connected to the headphone jack.

As shown in block 608, the method further includes receiving from the source image provider 230 the updated image content based on the communicated control information. The action described by the block 608 may be performed in a manner similar to the action described by the block 516. The method continues as needed to detect additional user input and provide additional user feedback.

Figure 7:
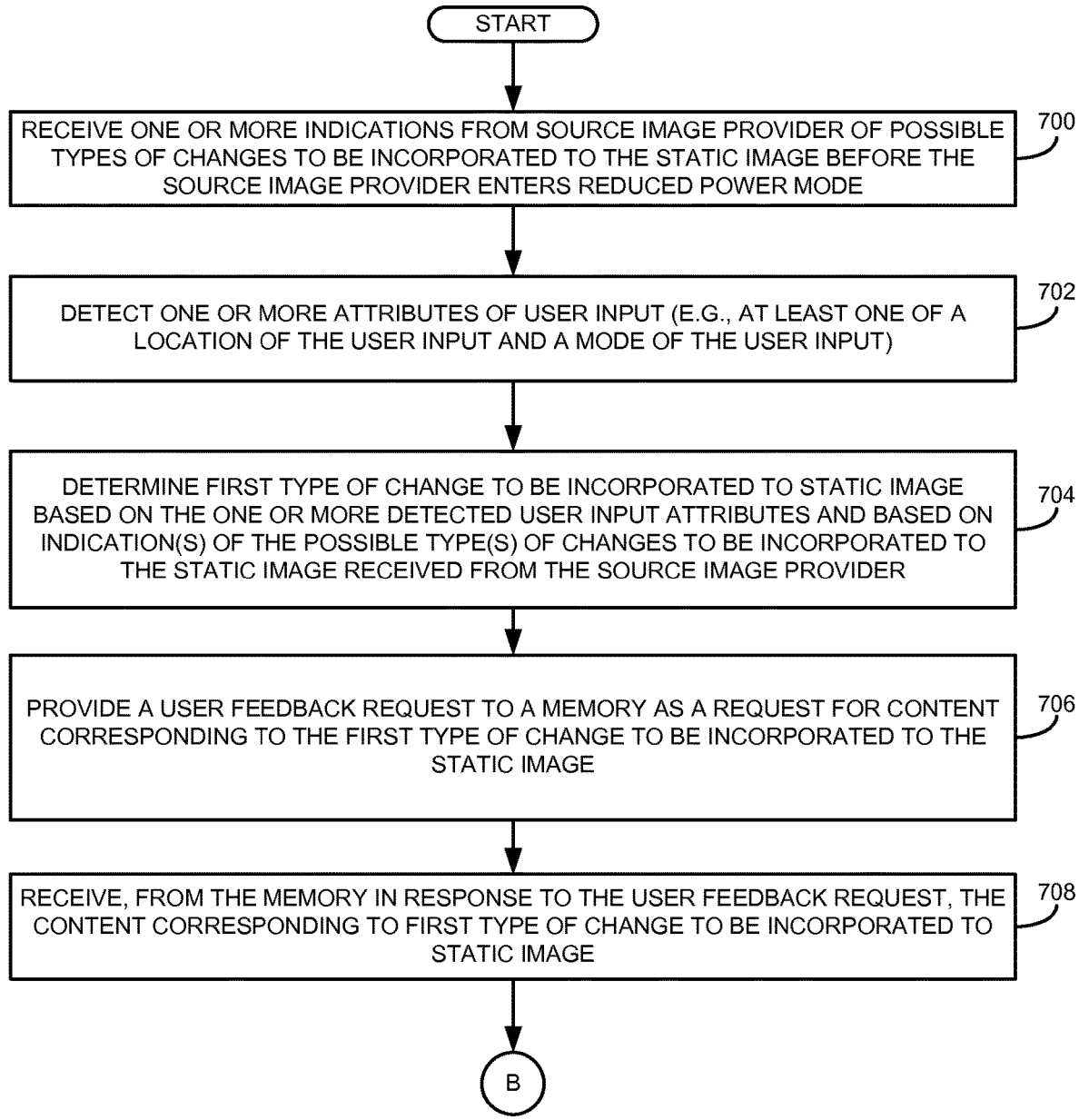
FIGS. 7 and 8 are flowcharts illustrating still another example of a method for responding to user input by way of a user interface for an apparatus that employs a display, in accordance with an example set forth in the disclosure.
Figure 8:
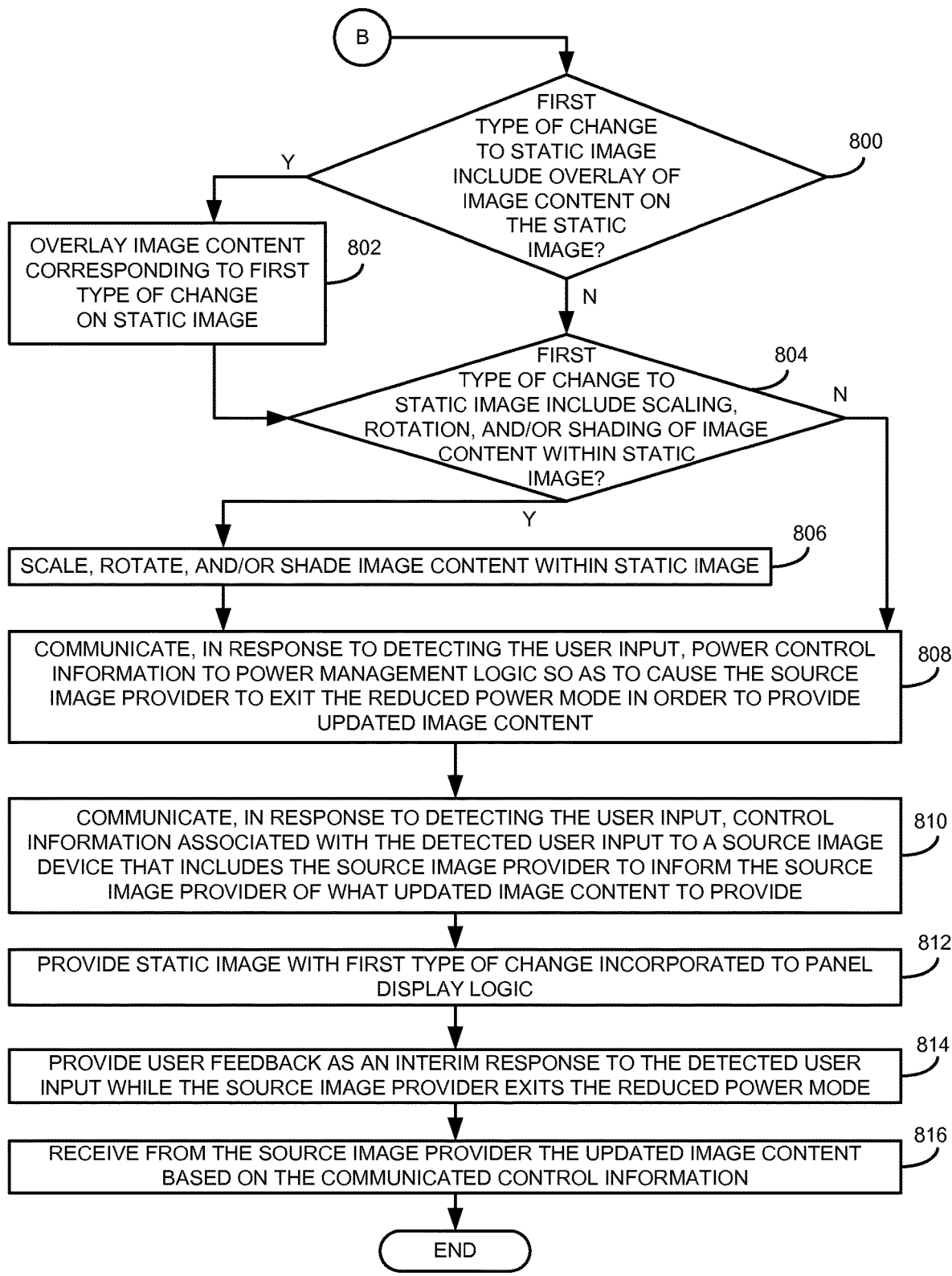

FIGS. 7 and 8 are flowcharts illustrating still another example of a method for responding to user input by way of a user interface for an apparatus that employs a display. It will be understood from the following description that FIGS. 7 and 8 show details of example manners of implementing several aspects of the method shown in FIG. 5. As will be recognized by one of ordinary skill in the art, some of the details illustrated in FIGS. 7 and 8 may, if desired, also be applied to providing audio feedback as discussed and illustrated with respect to FIG. 6.

As shown in block 700, the method includes receiving one or more indications from the source image provider 230 of possible types of changes to be incorporated to the static image before the source image provider 230 enters the reduced power mode. As aspects of the illustrated method may be applied to providing audio feedback, one or more indications of possible types of audio feedback may also or alternatively be received from the source image provider 230 before the source image provider 230 enters the reduced power mode. The source image provider 230 provides one or more indications of one or more possible types of user feedback to the control logic 222 via a connection to the auxiliary communication link 250-1 (shown with a dashed line in FIG. 2). The control logic 222 stores the received indication(s) of possible types of changes to be incorporated to the static image and/or possible types of audio feedback in the user feedback data portion 262 of the memory 214 using, for example, the communication link 260.

In one example, the source image provider 230 provides such one or more indications upon receiving a power management command via the source image provider power command communication link 240 and before entering the reduced power mode in response to receiving the power management command. The source image provider 230 may vary the particular indication or indications depending upon the type of image currently displayed on the display 216. For example, if a map is displayed on the display 216, one of the indications of a possible type of change may be an indication that a zooming is to be performed if a two-finger stretch or squeeze is detected. However, if the user interface for a media player were instead displayed on the display 216, then one of the indications of a possible type of change may be an indication that a volume bar is to be shown and that a change to the volume bar is to be displayed if a two-finger stretch or squeeze is detected.

In some embodiments, the source image provider 230 may provide only one indication of a possible type of change to be incorporated to the static image. With such a single indication, the source image provider 230 may provide, for example, an indication that that type of change is to be incorporated to the static image any time a user input is detected or, for example, any time a user input having certain attributes (e.g., being at a location corresponding to a selectable icon) is detected. In such examples, the USB controller 210 may be omitted and, if the same updated image content is to be provided whenever any user input is detected, the only information communicated from the user input sensor logic 208 to the source image device 202 may be the power control information communicated to the power management logic 228. That is, because any detected user input will cause the indicated type of change to be incorporated to the static image and the same updated image content to provided, only the power control information (which indicates whether a user input has been detected) needs to be communicated to the power management logic 228 in order to cause the source image provider 230 to exit the reduced power mode.

Similarly, in the example where any detected user input having certain attributes will cause the one indicated type of change to be incorporated to the static image, if any detection of a user input having those certain attributes will result in the same updated image content being provided by the source image provider 230, then the only information communicated from the user input sensor logic 208 to the source image device 202 may be the power control information and a suitable indication that a user input having the needed attributes (e.g., being at a location corresponding to a selectable icon) was detected.

As shown in block 702, the method further includes detecting one or more attributes of user input associated with the display 216. The detection of the one or more user input attributes may be performed as described with reference to FIGS. 5 and 6.

As shown in block 704, the method further includes determining a first type of change to be incorporated to the static image based on the one or more detected user input attributes and based on the one or more received indications of the possible type(s) of changes to be incorporated to the static image. As aspects of the method may be applied to providing audio feedback, the block 704 may also or alternatively include determining the type of audio feedback to provide.

In one example, when the source image provider 230 sends the one or more indications of the possible types of changes to be incorporated to the static image to the control logic 222, the source image provider 230 also sends indications of when each possible type of change should be incorporated to the static image. For example, if the source image provider 230 sends image data corresponding to an hourglass icon that is to be overlaid on the static image in order to incorporate the first type of change and provide user feedback, the source image provider 230 may also indicate to the control logic 222 that the hourglass icon is to be overlaid on the static image whenever the user makes a touch input that constitutes a selection of one of a plurality of icons displayed on the display 216.

As another example, if the source image provider 230 sends to the control logic 222: (i) image data corresponding to an hourglass icon along with an indication that the hourglass icon is to be overlaid on the static image whenever the user selects one of a certain group of icons displayed on the display 216 and (ii) an indication that the first type of change to be incorporated to the static image is a zooming in of the static image when the user performs a two-finger stretch with respect to a certain area of the content displayed on the display 216, then the control logic 222 determines, based on the indications received from the source image provider 230 and based on the one or more detected user input attributes, which type of change is to be incorporated to the static image as user feedback.

As shown in block 706, the method further includes providing a user feedback request to the memory 214 via the communication link 260 as a request for content corresponding to the first type of change to be incorporated to the static image. For example, if it is determined that the first type of change to be incorporated to the static image is an overlay of an hourglass icon, the hourglass icon will in one example have been stored in the user feedback data portion 262 of the memory 214 when the control logic 222 received the one or more indications of the possible types of changes to the static image from the source image provider 230. In this example, the control logic 222 makes a user feedback request to the user feedback data portion 262 of the memory 214 via the communication link 260 for the hourglass icon.

As another example, if it is determined that the first type of change to be incorporated to the static image is a zooming in of the static image, the panel display logic 212 will have stored the static image in the self refresh data portion 244 of the memory upon the occurrence of the static screen condition. In this example, the control logic 222 requests the static image from the self refresh data portion 244 of the memory via the communication link 260, the feedback data portion 262, and the read/write communication link 267.

Thus, the user feedback request provided to the memory 214 in executing the portion of the method shown in block 706 is, in some examples, a request for content corresponding to one of a plurality of possible types of changes to be incorporated to the static image, where the plurality of possible types of changes are indicated by the source image provider 230 before the source image provider 230 enters the reduced power mode. In this manner, instead of the control logic 222 needing to have all the information needed to use the detected user input attribute information in order to determine the first type of change to be incorporated to the static image before the computer system 200 begins operating and/or displaying image content on the display 216, the source image provider 230 provides information to be used in this determination to the control logic 222 before the source image provider 230 enters the reduced power mode.

As shown in block 708, the method further includes receiving, from the memory 214 in response to the user feedback request, the content corresponding to the first type of change to be incorporated to the static image. The control logic 222 may receive such content from the self refresh data portion 244 or the user feedback data portion 262 via the communication link 264 and, if receiving such content from the self refresh data portion 244, the read/write communication link 267 as well.

As shown in block 800, via the marker "B" that appears on both FIGS. 7 and 8 linking the blocks 708 and 800, the method further includes determining whether the first type of change to the static image includes the overlay of image content, such as an hourglass or other suitable icon, on the static image. While the block 800 is shown as a separate block for ease of understanding, it is to be understood that this determination may have been made in the execution of the portion of the method shown in block 704. In any event, if the first type of change to the static image includes the overlay of image content, the method proceeds to block 802, and the image content is overlaid, for example, using the overlay engine 224 as described above. From the block 802, the method proceeds to block 804. If, on the other hand, the first type of change to the static image does not include the overlay of image content, the method proceeds from the block 800 to the block 804.

As shown in block 804, the method further includes determining whether the first type of change to the static image includes scaling, rotation, and/or shading of image content within the static image. As with the block 800, it is to be understood that this determination may have been made in the execution of the portion of the method shown in block 704. In any event, if the first type of change to the static image includes scaling, rotation, and/or shading of image content within the static image, the method proceeds to block 806. If the first type of change to the static image does not include any of scaling, rotation, or shading of image content within the static image, the method proceeds to block 808.

In the event that the method proceeds to the block 806, the method further includes scaling, rotating, and/or shading image content within the static image. With reference to FIG. 2, the supporting processing engine 227 may include, in one example, a scaler, a rotation engine, and a shader. If desired, additional or alternative types of changes may be available to be incorporated to the static image during operation of the computer system 200, in which case the determination at the block 804 (and/or the block 704) may be adjusted accordingly, and in which case the capabilities of the supporting processing engine 227 may also be adjusted accordingly.

The supporting processing engine 227 communicates with the control logic 222 via a communication link 280 to receive image content, which may be, for example, the static image or the static image with image content overlaid thereon, and which is to have scaling, rotation, and/or shading operations applied. The supporting processing engine 227 applies one or more such operations to the image content it receives and then returns the image content incorporating the determined first type of change to the control logic 222 via the communication link 280. The returned image content incorporating the determined first type of change to the control logic 222 may be, for example, the static image with content overlaid thereon and a scaling operation then applied to the static image and overlaid content, the static image with at least a portion thereof scaled, the static image with overlay, scaling, and rotation applied thereto, etc.

As shown in the blocks 808 and 810, the method further includes communicating, in response to detecting the user input, power control information to the power management logic 228 so as to cause the source image provider 230 to exit the reduced power mode in order to provide updated image content (block 808) and communicating, in response to detecting the user input, control information associated with the detected user input to the source image device 204 which includes the source image provider 230 to inform the source image provider 230 of what updated image content to provide (block 810). The actions described by the blocks 808 and 810 may be performed in the same or similar manners as the actions described by the blocks 510 and 512 of FIG. 5, respectively.

As shown in block 812, the method further includes providing the static image with the first type of change incorporated to the panel display logic 212 for display on the display 216. In particular, the control logic 222, after incorporating the first type of change with the overlay engine 224 and/or the supporting processing engine 227, may provide the image content incorporating the first type of change to the panel display logic 212.

As shown in block 814, the method further includes providing the user feedback as an interim response to the detected user input while the source image provider 230 exits the reduced power mode. In other words, the user feedback constituted by the first type of change incorporated to the static image is displayed on the display 216 so that the user will not perceive the computer system 200 as being unresponsive while the source image provider 230 exits the reduced power mode.

As shown in block 816, the method further includes receiving from the source image provider 230 the updated image content based on the communicated control information. The action described by the block 816 may be performed in the same or a similar manner as the action described by the block 516 of FIG. 5. The method continues as needed to detect additional user input and provide additional user feedback.

As will be recognized by one of ordinary skill in the art, the blocks 700-704 may correspond to, for example, an implementation of the block 504 of FIG. 5. Additionally, the blocks 706, 708, and 800-806 may correspond to, for example, an implementation of the block 506 of FIG. 5. Furthermore, the blocks 812 and 814 may correspond to, for example, an implementation of the block 514 of FIG. 5. In some cases, not all of the blocks 504, 506, and 514 may be implemented as discussed with respect to FIGS. 7 and 8, and instead one or more of the blocks 504, 506, and 514 may be implemented using suitable techniques as discussed with respect to FIGS. 5 and 6. As one example, the block 504 need not be implemented by receiving one or more indications from the source image provider 230 of possible types of changes to be incorporated to the static image before the source image provider 230 enters the reduced power mode, as in block 700. In such an example, the block 700 may be omitted. However, in such an example, the block 506 may, if desired, be implemented according to the blocks 706, 708, and 800-806 of FIGS. 7 and 8.

Moreover, as aspects of the method may be applied to providing audio feedback, the blocks 706, 708, 800-806, 812, and/or 814, for example, may also or alternatively include performing analogous actions in order to request and provide audio feedback, as further discussed with respect to FIG. 6. While blocks corresponding to decision blocks 502 and 508 are not shown in FIGS. 7 and 8 for simplicity, the same or similar decisions may, if desired, be made at corresponding points in the method shown and described with respect to FIGS. 7 and 8.

Figure 9:
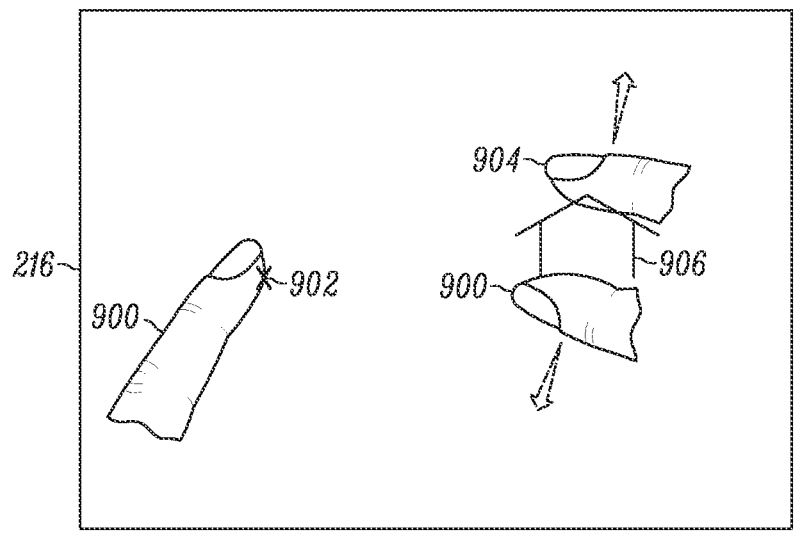
FIGS. 9 and 10 illustrate several examples of providing user feedback by incorporating a first type of change to a static image displayed on a display, in accordance with several examples set forth in the disclosure.
Figure 10:
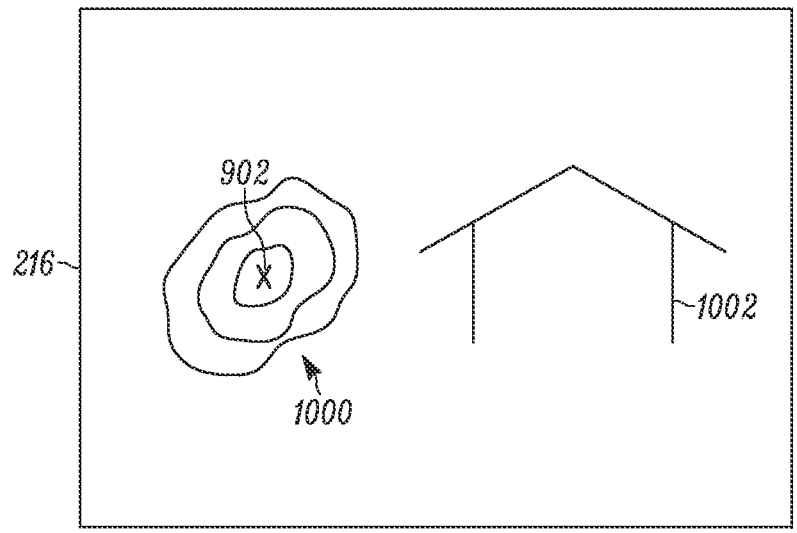

FIGS. 9 and 10 illustrate several examples of providing user feedback by incorporating a first type of change to a static image displayed on the display 216. As shown in FIG. 9, a user may provide a touch input with a first finger 900 to the touch input transducer 206 (not shown in FIGS. 9 and 10) during a static screen condition on the display 216 at a location 902 indicated by an "X." The "X" may not actually be displayed on the display 216, but is used in FIGS. 9 and 10 to denote the location 902 on the display 216. As shown in FIG. 10, a circle 1000 appears centered on the location 902 as the first type of change incorporated to the static image, in accordance with one of the examples discussed above.

Another example is also shown in FIG. 9, in which the user performs a two-finger stretch with, for example, the first finger 900 and a second finger 904 at the location of a picture 906 of a house displayed on the display 216 during a static screen condition. As shown in FIG. 10, a zoomed-in version 1002 of the same house appears as the first type of change incorporated to the static image in response to the detection of the two-finger stretch, in accordance with one of the examples discussed above. It will be understood that the touch input with the first finger 900 at the location 902 and the two-finger stretch may not be performed during the same static screen condition, but are shown together in FIGS. 9 and 10 as separate examples of a first type of change being incorporated to the static image.

Figure 11:
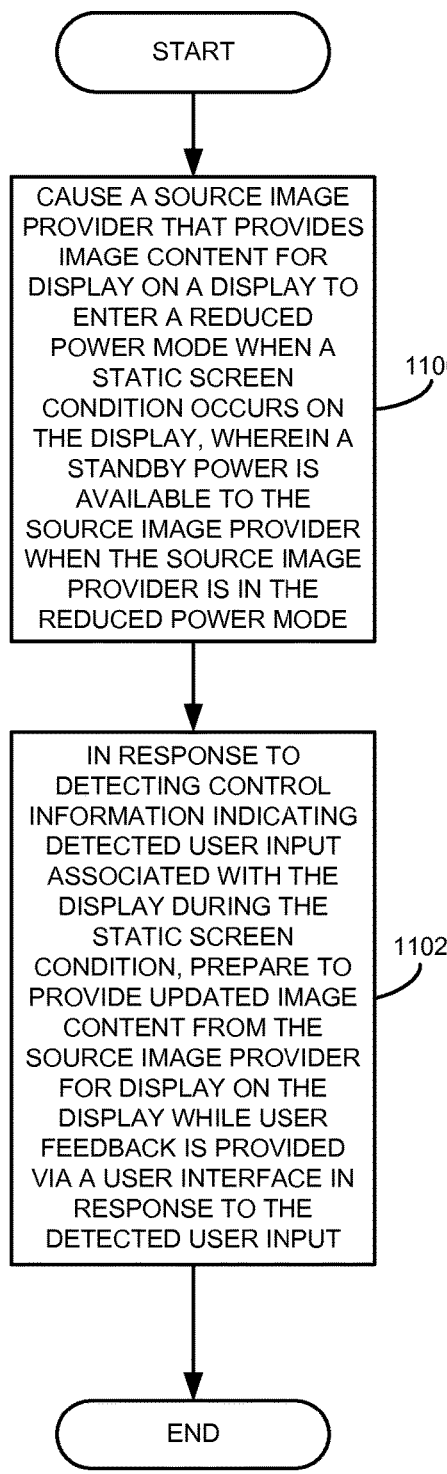
FIGS. 11 and 12 are flowcharts illustrating another example of a method for responding to user input by way of a user interface for an apparatus that employs a display, in accordance with an example set forth in the disclosure.

FIG. 11 is a flow chart illustrating another example of a method for responding to user input by way of a user interface for an apparatus that employs a display. As will be recognized by one of ordinary skill in the art, the aspects of the method illustrated in FIG. 11 may, if desired, be applied to providing audio user feedback as well as user feedback on the display.

As shown in block 1100, the method includes causing the source image provider 230 that provides image content for display on the display 216 to enter a reduced power mode when a static screen condition occurs on the display 216, wherein a standby power is available to the source image provider 230 when the source image provider 230 is in the reduced power mode. For example, the power management logic 228 may provide a power management command via the source image provider power command communication link 240 to cause the source image provider 230 to enter the reduced power mode when a static screen condition occurs on the display 216, as discussed above.

As shown in block 1102, the method further includes, in response to detecting control information indicating detected user input associated with the display 216 during the static screen condition, preparing to provide updated image content from the source image provider 230 for display on the display 216 while user feedback is provided via the user interface (e.g., the display 216 and/or the audio output 220) in response to the detected user input. The detected control information indicating the detected user input may be the control information as discussed above with respect to, for example, FIGS. 2 and 5-8.

Figure 12:
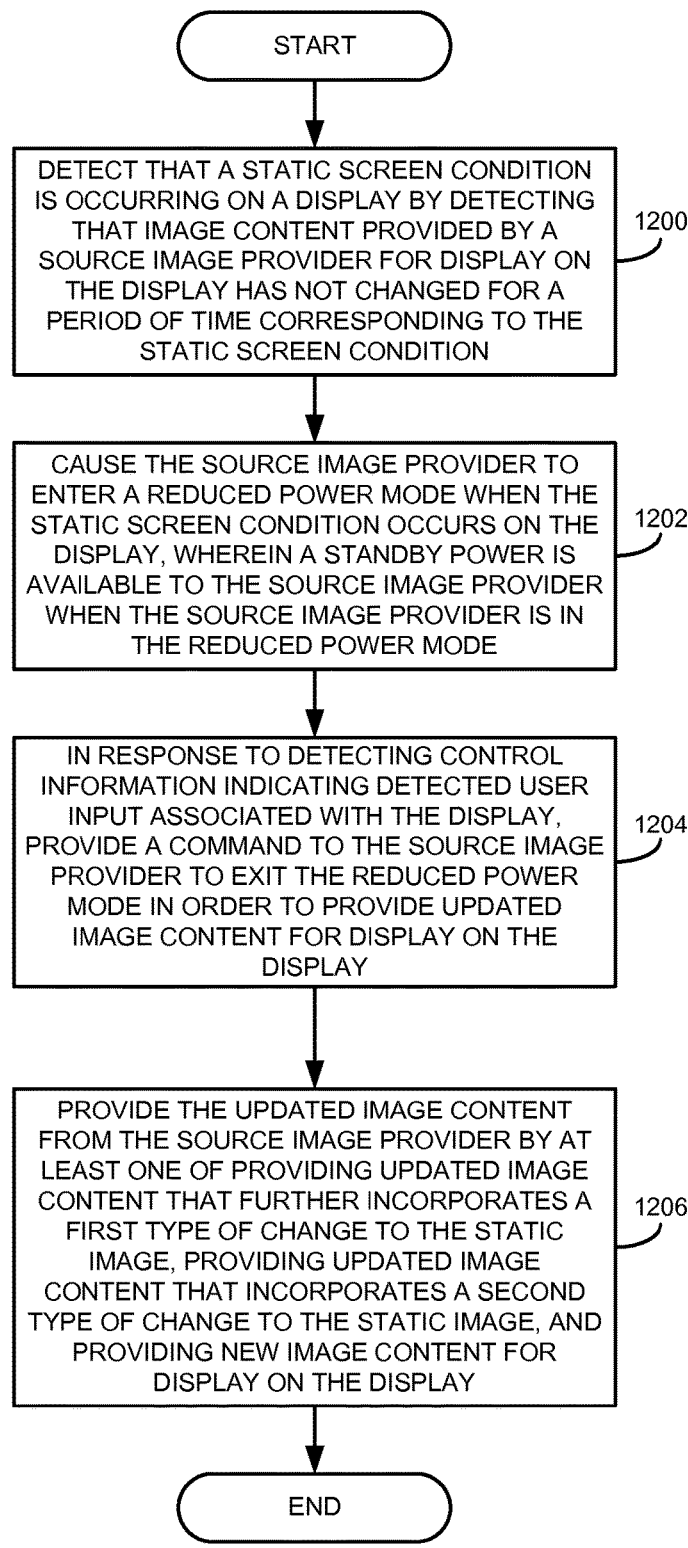

With continued reference to FIG. 11, reference is also made to FIG. 12, which is a flow chart illustrating another example of a method for responding to user input by way of a user interface for an apparatus that employs a display. As will be recognized by one of ordinary skill in the art, FIG. 12 shows details of example manners of implementing several of the aspects of the method shown in FIG. 11. As shown in block 1200, the method includes detecting that the static screen condition is occurring on the display 216 by detecting that the image content provided by the source image provider 230 for display on the display 216 has not changed for a period of time corresponding to the static screen condition. For example, the static screen detection information 238 may indicate that the static screen condition is occurring as discussed above.

As shown in block 1202, the method may further include causing the source image provider 230 to enter the reduced power mode as discussed with respect to, for example, the block 1100. As shown in block 1204, which may be an example manner of implementing the block 1102, the method may further include, in response to detecting the control information indicating the detected user input associated with the display 216, providing a command to the source image provider 230 to exit the reduced power mode in order to provide the updated image content for display on the display 216. For example, as discussed above, the power management logic 228 may provide a power management command via the source image provider power command communication link 240 to the source image provider 230 to cause the source image provider 230 to exit the reduced power mode.

As shown in block 1206, the method further includes providing the updated image content from the source image provider 230 by at least one of providing updated image content that further incorporates a first type of change to the static image for display on the display 216, providing updated image content that incorporates a second type of change to the static image for display on the display 216, and providing new image content for display on the display 216. The actions described with respect to the block 1206 may be implemented according to the description above with respect to, for example, FIGS. 2 and 5-8.

In view of the foregoing disclosure of the computer system 200 and example methods, it will be understood that various components within the computer system 200 may be implemented in any suitable manner. As one example, the panel display logic 212 and the user feedback generation logic 218 may be implemented jointly; that is, the features of the user feedback generation logic 218 may be incorporated into the panel display logic 212, and the panel display logic 212 and the user feedback generation logic 218 may not be physically separate. Other suitable variations of the computer system 200 and the example methods will be recognized by one of ordinary skill in the art.

Still further, it will be understood that each component of the system 200, including the components designated as various types of logic components, such as, for example, the user feedback generation logic 218 and the power management logic 228, may be implemented in hardware, software executing on one or more processors, one or more processors in combination with executable code stored in memory, or any suitable combination thereof.

Figure 13:
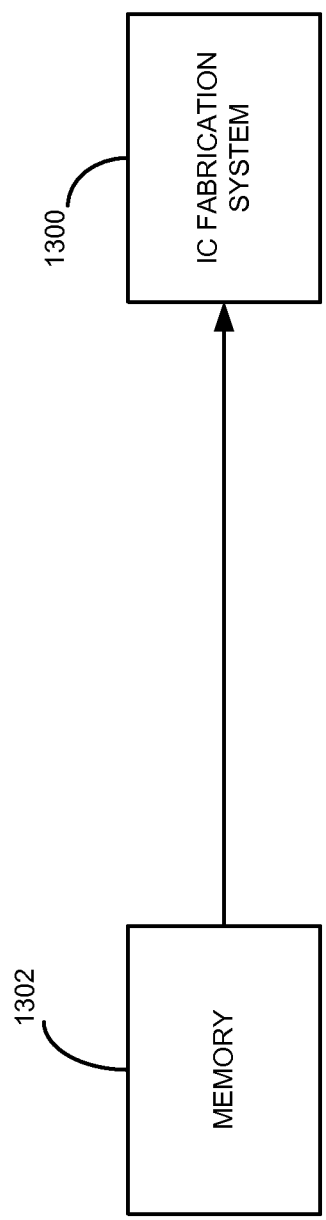
FIG. 13 is a block diagram illustrating one example of an integrated circuit fabrication system.

Referring to FIG. 13, an integrated circuit fabrication system 1300 is shown which may include access to memory 1302 which may be in any suitable form and any suitable location accessible via the web, accessible via hard drive or any other suitable way. The memory 1302 is a non-transitory computer readable medium such as but not limited to RAM, ROM, and any other suitable memory. The IC fabrication system 1300 may be one or more work stations that control a wafer fabrication to build integrated circuits. The memory 1302 may include thereon instructions that when executed by one or more processors causes the integrated circuit fabrication system 1300 to fabricate one or more integrated circuits that include the logic and structure described herein.

The disclosed integrated circuit designs may be employed in any suitable apparatus including but not limited to, for example, smart phones, tablets, or other handheld computers; laptop or desktop computers; digital televisions; or any other suitable device. Such devices may include, for example, a display that receives image data from the one or more integrated circuits where the one or more integrated circuits may be or may include, for example, an APU, GPU, CPU or any other suitable integrated circuit(s) that provide (s) image data for output on the display. Such an apparatus may employ the one or more integrated circuits as noted above including the user input sensor logic, the user feedback generation logic, the source image provider, and other components described above.

Also, integrated circuit design systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic and structure described herein may also be produced as one or more integrated circuits by such systems using the computer readable medium with instructions stored therein. For example, one or more integrated circuits with the aforedescribed logic and structure may be created using such integrated circuit fabrication systems. In such a system, the computer readable medium stores instructions executable by one or more integrated circuit design systems that causes the one or more integrated circuit design systems to produce one or more integrated circuits. The one or more integrated circuits include, for example, user input sensor logic and user feedback generation logic that provides user feedback for display while a source image provider is in or is exiting a reduced power mode, as described above.

Among other advantages, for example, one or more of the above embodiments may generate user feedback local to a display (e.g., a touch panel display) of, for example, a smart phone or a tablet, in a near-instantaneous manner and provide the user feedback for display on the display while a source image provider that has been put into a reduced power mode prepares to provide updated image content for display. Consequently, one or more of the above embodiments may avoid having a user of such a computer system perceive the computer system as being unresponsive to the user's input (e.g., a touch input to a touch panel display, or an input with a mouse, stylus, etc.) while the source image provider exits the reduced power mode. System battery life may also be increased.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method for responding to user input by way of a user interface for an apparatus that employs a display, comprising:
 during a static screen condition on the display, displaying a static image that was displayed before a source image provider enters a reduced power mode;
 detecting user input associated with the display wherein the static image provided by the source image provider is displayed on the display;
 in response to detecting the user input, providing user feedback by incorporating a first type of change to the static image displayed on the display without the use of the source image provider while the source image provider is in the reduced power mode wherein a standby power is available to the source image provider, and communicating control information associated with the detected user input to the source image provider, wherein the control information indicates to the source image provider the incorporation of the first type of change to the static image displayed on the display; and
 receiving from the source image provider updated image content based on the communicated control information.

2. The method of claim 1, wherein detecting the user input comprises determining the first type of change to be incorporated to the static image based on one or more attributes of the detected user input.

3. The method of claim 2, wherein receiving from the source image provider the updated image content comprises receiving, from the source image provider, image content that further incorporates the first type of change to the static image based on the communicated control information.

4. The method of claim 1, wherein receiving from the source image provider the updated image content comprises receiving, from the source image provider, image content that incorporates a second type of change to the static image based on the communicated control information.

5. The method of claim 1, wherein receiving from the source image provider the updated image content comprises receiving, from the source image provider, new image content based on the communicated control information.

6. The method of claim 1, comprising communicating, in response to detecting the user input, power control information to power management logic so as to cause the source image provider to exit the reduced power mode in order to provide the updated image content.

7. The method of claim 1, comprising receiving, in response to detecting the user input, content corresponding to the first type of change to be incorporated to the static image from a memory that also stores self refresh data for the display.

8. The method of claim 1, wherein incorporating the first type of change to the static image displayed on the display comprises incorporating a type of change selected from the group consisting of a circle corresponding to a location of the detected user input, a visual indication that the source image provider is preparing to provide the updated image content, a rotation of a portion of the static image, a change in color of a portion of the static image, a popup window, a scrolling of the static image, a zooming in of the static image, and a zooming out of the static image.

9. The method of claim 1, wherein receiving the updated image content from the source image provider comprises receiving updated image content selected from the group consisting of a new image corresponding to a user selection indicated by the detected user input, a zoomed-in version of the static image relative to a zooming in of the static image performed while providing the user feedback, a zoomed-out version of the static image relative to a zooming out of the static image performed while providing the user feedback, and a scrolled version of the static image relative to a scrolling of the static image performed while providing the user feedback.

10. The method of claim 1, wherein providing the user feedback is further performed by providing audio feedback via the user interface while the source image provider is in the reduced power mode.

11. The method of claim 1, wherein one or more of detecting the user input associated with the display and providing the user feedback is performed by at least a portion of one or more of a touch input device and a user interface subsystem.

12. The method of claim 11, wherein providing the user feedback comprises providing one or more of a visual update and an audio update.

13. The method of claim 11, comprising providing, by an operating system associated with the user interface subsystem, a signal to a source image device that includes the source image provider, the signal indicating one or more of power control information and information regarding the detected user input.

14. An apparatus comprising:
user input sensor logic comprising at least a first processor and operative to detect user input associated with a display during a static screen condition on the display wherein the display displays a static image that was displayed before a source image provider enters a reduced power mode and the static image is provided by the source image provider to be displayed on the display; and
user feedback generation logic comprising at least a second processor and operatively coupled to the user input sensor logic, and operative to:
in response to the user input sensor logic detecting the user input, determine a first type of change to be incorporated to the static image so as to provide user feedback on the display without the use of the source image provider while the source image provider that provided the static image is in the reduced power mode wherein a standby power is available to the source image provider, and communicate control information associated with the detected user input to the source image provider, wherein the control information indicates to the source image provider the incorporation of the first type of change to the static image displayed on the display; and
receive from the source image provider updated image content based on the control information associated with the detected user input that has been communicated to the source image provider.

15. The apparatus of claim 14, further comprising a memory operatively coupled to the user feedback generation logic;
wherein the user feedback generation logic is operative to:
provide a user feedback request to the memory as a request for content corresponding to the first type of change to be incorporated to the static image; and
receive, from the memory in response to the user feedback request, user feedback information including the content corresponding to the first type of change to be incorporated to the static image.

16. The apparatus of claim 15, wherein the user feedback generation logic is operative to:
receive indications of a plurality of possible types of changes to be incorporated to the static image from the source image provider before the source image provider enters the reduced power mode; and
provide, based on the detected user input, the user feedback request to the memory as a request for content corresponding to one of the plurality of possible types of changes to be incorporated to the static image.

17. The apparatus of claim 14, wherein the user feedback generation logic comprises an overlay engine operative to overlay image content on the static image in order to incorporate the first type of change to the static image.

18. The apparatus of claim 14, wherein the user feedback generation logic comprises:
control logic operatively coupled to the user input sensor logic and operative to:
determine the first type of change to be incorporated to the static image in order to provide the user feedback; and
provide the user feedback for display on the display;
an overlay engine operatively coupled to the control logic and operative to overlay image content on the static image when the first type of change to be incorporated to the static image includes an overlay of image content on the static image; and
a scaler operatively coupled to the control logic and operative to scale at least a portion of the static image when the first type of change to be incorporated to the static image includes scaling of image content within the static image.

19. The apparatus of claim 14, further comprising:
the source image provider; and
power management logic operatively coupled to the source image provider and operative to:
receive power control information from the user input sensor logic in response to the user input sensor logic detecting the user input; and
cause the source image provider to exit the reduced power mode in response to receiving the power control information.

20. The apparatus of claim 19, further comprising the display.

21. The apparatus of claim 14, wherein the user feedback generation logic comprises at least a portion of one or more of a touch input device and a user interface subsystem.

22. The apparatus of claim 21, wherein the user feedback generation logic provides one or more of a visual update and an audio update.

23. The apparatus of claim 21, wherein an operating system associated with the user interface subsystem provides a signal to a source image device that includes the source image provider.

* * * * *